United States Patent
Amy et al.

(10) Patent No.: US 10,059,609 B2
(45) Date of Patent: Aug. 28, 2018

(54) ANAEROBIC ELECTROCHEMICAL MEMBRANE BIOREACTOR AND PROCESS FOR WASTEWATER TREATMENT

(71) Applicant: KING ABDULLAH UNIVERSITY OF SCIENCE AND TECHNOLOGY, Thuwal (SA)

(72) Inventors: Gary Amy, Thuwal (SA); Krishna Katuri, Thuwal (SA); Craig Werner, Thuwal (SA); Pascal Saikaly, Thuwal (SA); Rodrigo Jimenez Sandoval, Thuwal (SA); Zhiping Lai, Thuwal (SA); Wei Chen, Thuwal (SA); Sungil Jeon, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/109,810

(22) PCT Filed: Jan. 6, 2015

(86) PCT No.: PCT/US2015/010276
§ 371 (c)(1),
(2) Date: Jul. 5, 2016

(87) PCT Pub. No.: WO2015/103590
PCT Pub. Date: Jul. 9, 2015

(65) Prior Publication Data
US 2016/0326031 A1    Nov. 10, 2016

Related U.S. Application Data

(60) Provisional application No. 61/924,016, filed on Jan. 6, 2014.

(51) Int. Cl.
*C02F 3/00*  (2006.01)
*C02F 3/28*  (2006.01)
(Continued)

(52) U.S. Cl.
CPC .......... *C02F 3/005* (2013.01); *C02F 1/46109* (2013.01); *C02F 3/2853* (2013.01);
(Continued)

(58) Field of Classification Search
CPC .... C02F 3/005; C02F 3/2853; C02F 1/46109; C02F 3/341; C02F 2001/46133;
(Continued)

(56) References Cited

U.S. PATENT DOCUMENTS

2009/0297890 A1\* 12/2009 Shimomura ............ H01M 4/86
429/2
2010/0151279 A1   6/2010 Logan et al.
(Continued)

FOREIGN PATENT DOCUMENTS

CN    102 616 918 A    8/2012
WO    WO 2001/038453 A1    5/2001
(Continued)

OTHER PUBLICATIONS

International Search Report dated Mar. 27, 2015, issued in International Application No. PCT/US2015/010276.
(Continued)

*Primary Examiner* — Fred Prince
(74) *Attorney, Agent, or Firm* — Alston & Bird LLP

(57) ABSTRACT

An anaerobic electrochemical membrane bioreactor (AnEMBR) can include a vessel into which wastewater can be introduced, an anode electrode in the vessel suitable for supporting electrochemically active microorganisms (EAB, also can be referred to as anode reducing bacteria, exoelectrogens, or electricigens) that oxidize organic compounds in
(Continued)

the wastewater, and a cathode membrane electrode in the vessel, which is configured to pass a treated liquid through the membrane while retaining the electrochemically active microorganisms and the hydrogenotrophic methanogens (for example, the key functional microbial communities, including EAB, methanogens and possible synergistic fermenters) in the vessel. The cathode membrane electrode can be suitable for catalyzing the hydrogen evolution reaction to generate hydrogen.

19 Claims, 25 Drawing Sheets

Specification includes a Sequence Listing.

(51) Int. Cl.
  *C02F 3/34* (2006.01)
  *C02F 1/461* (2006.01)
  *H01M 8/16* (2006.01)
(52) U.S. Cl.
  CPC .............. *C02F 3/341* (2013.01); *H01M 8/16* (2013.01); *C02F 2001/46133* (2013.01); *C02F 2001/46161* (2013.01); *C02F 2201/4618* (2013.01); *C02F 2303/10* (2013.01); *Y02E 50/343* (2013.01); *Y02W 10/30* (2015.05)
(58) Field of Classification Search
  CPC ........ C02F 2001/46161; C02F 2303/10; C02F 2201/4618; H01M 8/16; Y02E 50/343; Y02W 10/30
  USPC .... 210/603, 748.01, 192; 205/637, 638, 639
  See application file for complete search history.

(56) References Cited

U.S. PATENT DOCUMENTS

| | | |
|---|---|---|
| 2011/0236724 A1 | 9/2011 | Mayer et al. |
| 2011/0306089 A1 | 12/2011 | Sowers et al. |
| 2012/0100590 A1 | 4/2012 | Tartakovsky et al. |
| 2012/0132521 A1* | 5/2012 | Silver .............. C02F 3/005 204/252 |
| 2013/0017414 A1 | 1/2013 | He |
| 2013/0017415 A1 | 1/2013 | He |
| 2013/0026029 A1 | 1/2013 | Kayaert |
| 2013/0217089 A1* | 8/2013 | Hafez .............. C12M 21/04 435/168 |

FOREIGN PATENT DOCUMENTS

| | | |
|---|---|---|
| WO | WO 2005/005981 A2 | 1/2005 |
| WO | WO 2011/111879 A1 | 9/2011 |
| WO | 2012/094538 A1 | 7/2012 |
| WO | WO 2013/069889 A1 | 5/2013 |

OTHER PUBLICATIONS

Written Opinion of the International Searching Authority dated Mar. 27, 2015, issued in International Application No. PCT/US2015/010276.
Notification Concerning Transmittal of International Preliminary Report on Patentability (Chapter I of the Patent Cooperation Treaty) dated Jul. 21, 2016, issued in International Application No. PCT/US2015/010276.
Achilli, A, Marchand E. and Childress A.; "A Performance Evaluation of Three Membrane Bioreactor Systems: Aerobic, Anaerobic, and Attached-Growth"; Water Science & Technology, 2011, 63, 2999-3005.
APHA, Standard Methods for the Examination of Water and Wastewater. 20th ed.; American Public Health Association, American Water Works Association, Water Environment Federation: Washington DC, 1998.
Basu, S.; Khan, A. L.; Cano-Odena, A.; Liu, C.; Vankelecom, I. F.; "Membrane-Based Technologies for Biogas Separations", Chem. Soc. Rev., 2010, 39, 750-768.
Call, D., Wagner, R., and Logan, B.; "Hydrogen Production by Geobacter Species and a Mixed Consortium in a Microbial Electrolysis Cell"; Applied and Environmental Microbiology; 2009, 75, (24), 7579.
Call, D.; and Logan, B. E.; "Hydrogen Production in a Single Chamber Microbial Electrolysis Cell Lacking a Membrane"; Environ. Sci. Technol.; 2008, 42, (9), 3401-3406.
Clauwaert, P. And Verstraete, W.; "Methanogensis in Membraneless Microbial Electrolysis Cells"; Applied Microbiology and Biotechnology, 2009, 82, 829-836.
Cummings, D. E.; Snoeyenbos-West, O. L.; Newby, D. T.; Niggemyer, A. M.; Lovley, D. R.; Achenbach, L. A.; Rosenzweig, R. F., "Diversity of Geobacteraceae Species Inhabiting Metal-Polluted Freshwater Lake Sediments Ascertained by 16S rDNA Analyses"; Microb. Ecol. 2003, 46, (2), 257-269.
Cusick, R. D., Bryan, B., Parker, D. S., Merrill, M. D., Mehanna, M., Kiely, P. D., Liu, G. and Logan, B. E.; "Performance of a Pilot-Scale Continuous Flow Microbial Electrolysis Cell Fed Winery Wastewater"; Applied Microbiology and Biotechnology, 2011, 89, 2053-2063.
DeBeer, D.; Stoodley, P.; "Microbial Biofilms"; Prokaryotes; 2006; 1:904-937.
Extended European Search Report from European Patent Application No. 15733292.5 dated May 10, 2017, 8 pages.
Foresti, E., Zaiat, M. and Vallero, M.; "Anaerobic Precesses as the Core Technology for Sustainable Domestic Wastewater Treatment: Consolidated Applications, New Trends, Perspectives, and Challenges"; Reviews in Environmental Science and Bio/Technology (2006)5:3-19.
Garcia, J.-L., Patel, B. K. and Ollivier, B., Anaerobe; "Taxonomic, Phylogenetic, and Ecological Diversity of Methanogenic Archaea"; (2000) 6, 205-226.
Ge, Z., Li, J., Xiao, L., Tong Y. and He, Z.; "Recovery of Electric Energy in Microbial Fuel Cells"; Environmental Science & Technology Letters; (2014) 1, 137-141.
Ge, Z., Ping, Q. and He, Z.; "Hollow-Fiber Membrane Bioelectrochemical Reactor for Domestic Wastewater Treatment"; Journal of Chemical Technology & Biotechnology, (2013) 88, 1584-1590.
He, Z.; Wagner, N.; Minteer, S. D.; Angenent, L. T.; An Upflow Microbial Fuel Cell with an Interior Cathode: Assessment of the Internal Resistance by Impedance Spectroscopy; Environ. Sci. Technol.; 2006, 40, 5212-5217.
Jeremiasse, A. W., Hamelers, H. V. M., Saakes M. and Buisman, C. J. N.; "Ni Foam Cathode Enables High Volumetric $H_2$ Production in a Microbial Electrolysis Cell"; Int. J. Hydrogen Energy; (2010) 35, 12716-12723.
Judd, S.; "The Status of Membrane Bioreactor Technoloy"; Trends in Biotechnology; (2008) vol. 26, No. 2; pp. 109-116.
Jung, S. and Regan, J.; "Influence of External Resistance on Electrogenesis, Methanogensis, and Anode Prokaryotic Communities in Microbial Fuel Cells"; Applied and Environmental Microbiology, (2011) 77, pp. 564-571.
Katuri, K., Kavanagh, P., Rengaraj, S. and Leech, D.; "Geobacter Sulfurreducens Biofilms Developed Under Different Growth Conditions on Glassy Carbon Electrodes: Insights Using Cyclic Voltammetry"; Chemical Communications, 2010, 46, 4758-4760.
Kim, J.; Kim, K.; Ye, H.; Lee, E.; Shin, C.; McCarty, P. L.; Bae, J.; "Anaerobic Fluidized Bed Membrane Bioreactor for Wastewater Treatment"; Environ. Sci. Technol.; 2011, 45, (2), 576-581.
Lee, H.-S.; Torres, C. s. I.; Parameswaran, P.; Rittmann, B. E.; Fate of $H_2$ in an Upflow Single-Chamber Microbial Electrolysis Cell Using a Metal-Catalyst-Free Cathode; Environ. Sci. Technol. 2009, 43, 7971-7976.

(56) References Cited

OTHER PUBLICATIONS

Liao, B.-Q., Kraemer, J. T. and Bagley, D. M.; "Anaerobic Membrane Bioreactors: Applications and Research Directions"; Critical Reviews in Environmental Science and Technology; 2006, 36, 489-530.
Liu, H., Grot, S. and Logan, B. E.; "Electrochemically Assisted Microbial Production of Hydrogen from Acetate"; Environmental Science & Technology; 2005, 39, 4317-4320.
Liu, J., Liu, L., Gao, B. and Yang, F.; "Integration of Bio-Electromechanical Cell in Membrane Bioreactor for Membrane Cathode Fouling Reduction Through Electricity Generation"; Journal of Membrane Science; 430 (2013) 196-202.
Logan, B. E. and Rabaey, K.; "Conversion of Wastes into Bioelectricity and Chemicals Using Microbial Electrochemical Technologies"; Science, 2012, vol. 337, pp. 686-690.
Logan, B. E.; Cheng, S.; Watson, V.; Estadt, G.; "Graphite Fiber Brush Anodes for Increased Power Produuction in Air-Cathode Microbial Fuel Cells"; Environ. Sci. Technol. 2007, 41, 3341-3346.
Lu, L.; Xing, D.; Xie, T.; Ren, N.; Logan, B. E.; "Hydrogen Production from Proteins Via Electrohydrogenesis in Microbial Electrolysis Cells"; Biosensors and Bioelectronics 25 (2010) 2690-2695.
Malaeb, L., Katuri, K. P., Logan, B. E., Maab, V., Nunes, S. P. and Saikaly, P. E.; "A Hybrid Microbial Fuel Cell Membrane Bioreactor with a Conductive Ultrafiltration Membrane Biocathode for Wastewater Treatment"; Environmental Science & Technology, 2013, 47, 11821-11828.
McCarty, P. L., Bae, J. and Kim, J.; "Domestic Wastewater Treatment as a Net Energy Producer—Can This Be Achieved?"; Environmental Science & Technology; 2011, 45, 7100-7106.
Meng, B, Tan, X, Meng, X., Qiao S, and Liu, S.; "Porous and Dense Ni Hollow Fibre Membranes"; Journal of Alloys and Compounds, 470 (2009) 461-464.
Parameswaran, P., Tones, C. I., Lee, H. S., Krajmalnik-Brown, R. and Rittmann, B. E.; "Syntrophic Interactions Among Anode Respiring Bacteria (ARB) and Non-ARB in a Biofilm Anode: Electron Balances"; Biotechnology and Bioengineering, 2009, vol. 103, No. 3, 513-523.
Parameswaran, P.; Torres, C. I.; Kang, D.-W.; Rittmann, B. E.; Krajmalnik-Brown, R.; "The Role of Homoacetogenic Bacteria as Efficient Hydrogen Scavengers in Microbial Electrochemical Cells (MXCs)"; Water Science & Technology; 2012, 65.1, pp. 1-6.
Parameswaran, P.; Torres, C. I.; Lee, H.-S.; Rittmann, B. E.; Kmjmalnik-Brown, R.; "Hydrogen Consumption in Microbial Electrochemical Systems (MXCs): The Role of Homo-Acetogenic Bacteria"; Bioresource Technology 102 (2011) 263-271.
Parkin, G. F. and Owen, W. F.; "Fundamentals of Anaerobic Digestion"; Journal of Environmental Engineering; 1986, 112(5) 867-920.
Rabaey, K. and Verstraete, W.; "Microbial Fuel Cells: Novel Biotechnology for Energy Generation"; Trends in Biotechnology; vol. 23, No. 6, Jun. 2005, pp. 291-298.
Rabaey, K.; "Bioelectrochemical Systems: From Extracellular Electron Transfer to Biotechnological Application"; Intl Water Assn; 2010; pp. 1-14.

Rader, G. K. and Logan, B. E.; "Multi-Electrode Continuous Flow Microbial Electrolysis Cell for Biogas Production from Acetate"; International Journal of Hydrogen Energy, 35 (2010) 8848-8854.
Ren, L.; Ahn, Y.; Logan, B. E., A two-stage microbial fuel cell and anaerobic fluidized bed membrane bioreactor (MFC-AFMBR) system for effective domestic wastewater treatment. Environ. Sci. Technol. 2014, 48, (7), 4199-4206.
Ribot-Llobet, E.; Nam, J.-Y.; Tokash, J. C.; Guisasola, A.; Logan, B. E.; "Assessment of Four Different Cathode Materials at Different Initial pHs Using Unbuffered Catholytes in Microbial Electrolysis Cells"; Int. J. Hydrogen Energ. 38 (2013) 2951-2956.
Ritalahti, K.M., Amos, B.K., Sung, Y., Wu, Q., Koenigsberg, S.S., Löffler, F.E.; "Quantitative PCR Targeting 16S rRNA and Reductive Dehalogenase Genes Simultaneously Monitors Multiple Dehalococcoides Strains"; Applied and Environmental Microbiology, 72(4), 2765-2774.
Rozendal, R. A.; Hamelers, H. V. M.; Euverink, G. J. W.; Metz, S. J.; Buisman, C. J. N.; "Principle and Perspectives of Hydrogen Production Through Biocatalyzed Electrolysis"; Int. J. Hydrogen Energy 31 (2006) 1632-1640.
Rozendal, R.; Hamelers, H. V. M.; Molenkamp, R. J.; Buisman, C. J. N.; "Performance of Single Chamber Biocatalyzed Electrolysis With Different Types of Ion Exchange Membranes"; Water Research 41 (2007) 1984-1994.
Selembo, P. A.; Merrill, M. D.; Logan, B. E.; "Hydrogen Production with Nickel Powder Cathode Catalysts in Microbial Electrolysis Cells"; Int. J. Hydrogen Energy 35 (2010) 428-437.
Selembo, P. A.; Merrill, M. D.; Logan, B. E.; "The Use of Stainless Steel and Nickel Alloys as Low-Cost Cathodes in Microbial Electrolysis cells"; J. Power Sources 190 (2009) 271-278.
Shao, L.; Low, B. T.; Chung, T.-S.; Greenberg, A. R.; Polymeric Membranes for the Hydrogen Economy: Contemporary Approaches and Prospects for the Future; J. Membr. Sci. 327 (2009) 18-31.
Sleutels, T. H. J. A.; Lodder, R.; Hamelers, H. V. M.; Buisman, C. J. N.; "Improved Performance of Porous Bio-Anodes in Microbial Electrolysis Cells by Enhancing Mass and Charge Transport"; International Journal of Hydrogen Energy 34 (2009) 9655-9661.
Tian, Y., Ji, C., Wang K. and Le-Clech, P.; "Assessment of an Anaerobic Membrane Bio-Electromechanical Reactor (AnMBER) for Wastewater Treatment and Energy Recovery"; Journal of Membrane Science 450 (2014) 242-248.
Wang, Y.-K., Sheng, G.-P., Li, W.-W., Huang, Y.-X., Yu, Y.-Y., Zeng, R. J. and Yu, H.-Q.; "Development of a Novel Bioeletrochemical Membrane Reactor for Wastewater Treatment"; Environmental Science & Technology 2011, 45, 9256-9261.
Wang, Y.-K., Sheng, G.-P., Shi, B.-J., Li, W.-W. and Yu, H.-Q.; "A Novel Electrochmical Membrane Bioreactor as a Potential Net Energy Producer for Sustainable Wastewater Treatment"; Scientific Reports, 2013, 3: 1864; pp. 1-6.
Wang, Y.-P., Liu, X.-W., Li, W.-W., Li, F., Wang, Y.-K., Sheng, G.-P., Zeng, R. J. and Yu, H.-Q.; "A Microbial Fuel Cell-Membrane Bioreactor Integrated System for Cost Effective Wastewater Treatment"; Applied Energy 98 (2012) 230-235.
Yu, Y., Lee, C., Kim, J., Hwang, S.; "Group-Specific Primer and Probe Sets to Detect Methanogenic Communities Using Quantitative Real-Time Polymerase Chain Reaction"; Biotechnology and Bioengineering, 2005, vol. 89, No. 6, pp. 670-679.

\* cited by examiner

ANAEROBIC ELECTROCHEMICAL MEMBRANE BIOREACTOR AND PROCESS FOR WASTEWATER TREATMENT

CLAIM OF PRIORITY

This application claims priority under 35 USC 371 to International Application No. PCT/US2015/010276, filed Jan. 6, 2015, which claims the benefit of prior U.S. Provisional Application No. 61/924,016 filed Jan. 6, 2014, each of which is incorporated by reference in its entirety.

REFERENCE TO SEQUENCE LISTING

The Sequence Listing submitted Jul. 17, 2018, as a text file named "KAUST 061 03 ST25.txt," created on Jul. 17, 2018, and having a size of 4,457 bytes is hereby incorporated by reference.

TECHNICAL FIELD

The present invention relates to an electrochemical membrane bioreactor and a process for wastewater treatment.

BACKGROUND

The global demand for freshwater continues to place significant pressure on available water resources. Wastewater reclamation and reuse as well as desalination are the only opportunities to increase the supply of clean water and are therefore essential to meet the demand for freshwater sources. Domestic wastewater in particular represents a viable water source for many cities whereas desalination is limited to those near the coast. Conventional domestic wastewater treatment processes based on activated sludge (AS) are energy intensive (~0.6 kWh/m$^3$) and have a large footprint. Considering the fact that domestic wastewater is estimated to contain approximately 2 kWh/m, an opportunity exists to offset energy consumption for wastewater treatment through recovery of the inherent energy.

Bioelectrochemical systems use bacteria as biological catalysts to drive electrochemical reactions at the surface of one or both electrodes. These systems offer an alternative approach to conventional aerobic wastewater treatment as they do not require energy intensive aeration to promote biological degradation of the organic material in the wastewater. See PCT Publication No. WO 2001/038453, which is incorporated by reference in its entirety.

SUMMARY

An energy-positive anaerobic process can integrate a microbial electrolysis cell with a membrane bioreactor. The process can be used for treatment of a low strength organic solution with resource recovery, for example, energy and reclaimed water, referred to herein as wastewater. The process can make use of a hollow fiber electrode, for example, nickel-based hollow fiber membranes (Ni-HFM), to serve the dual purpose of cathode electrode and membrane filter. Energy from the process can be recovered in the form of biogas composed predominantly of methane that can be generated via hydrogenotrophic methanogenesis. For example, the system can produce a net energy of 0.23 kWh/m$^3$ at an applied voltage of 0.7 V. Biofouling on membranes can be reduced when the rate of hydrogen production is increased, for example, at high applied voltage (0.9 V).

An anaerobic electrochemical membrane bioreactor (AnEMBR) can include a vessel into which wastewater can be introduced, an anode electrode in the vessel suitable for supporting electrochemically active microorganisms (EAB, also can be referred to as anode reducing bacteria, exoelectrogens, or electricigens) that oxidize organic compounds in the wastewater, and a cathode membrane electrode in the vessel, which is configured to pass a treated liquid through the membrane while retaining the electrochemically active microorganisms and the hydrogenotrophic methanogens (for example, the key functional microbial communities, including EAB, methanogens and possible synergistic fermenters) in the vessel. The cathode membrane electrode can be suitable for catalyzing the hydrogen evolution reaction to generate hydrogen.

The reactor can further include an inlet configured to supply the liquid into the vessel and an outlet configured to remove the liquid from the vessel after the liquid passes through the cathode membrane electrode. The reactor can also include a power supply and a pump arranged to remove the liquid from the outlet. The reactor can further include a gas outlet and a gas collector.

The anode electrode can include carbon-based material, for example, graphite. The cathode membrane electrode can include one or more of hollow fibers, which can be a conductive porous hollow fiber. The hollow fiber can have less than 1 mm diameter and have a plurality or pores. The hollow fiber can be made of metal or other conductive materials and coated with a carbon-based material. For example, the hollow fiber can be made of nickel-based material with graphene coating.

The anode electrode can be configured to be surrounded by the cathode membrane electrode or the cathode electrode to be surrounded by the anode electrode for a more compact design of the reactor. Alternatively, the anode electrode and the cathode electrode can be arranged next to each other, for example, configured to be positioned vertically or horizontally with respect to each other in the vessel. The anode electrode can also be configured in different ways, such as flat carbon cloth, graphite plate, and graphite granules, or other materials.

A method of treating wastewater can include introducing the wastewater through the inlet of the AnEMBR, passing the wastewater through the membrane electrode while retaining key functional microorganism in the vessel, and removing the liquid through from the outlet. A method of recovering energy from an electrochemical membrane bioreactor can include collecting biogas generated at the surface of the cathode membrane electrode. The biogas can be hydrogen gas or methane, or a combination thereof. The generation of biogas evolving at the surface can reduce biofouling at a surface of an electrode, or can mitigate biofouling.

Other aspects, embodiments, and features will be apparent from the following description, the drawings, and the claims.

BRIEF DESCRIPTION OF THE DRAWINGS

FIG. 3D is the XRD pattern of the Ni-HFM.

DETAILED DESCRIPTION

Figure 1:
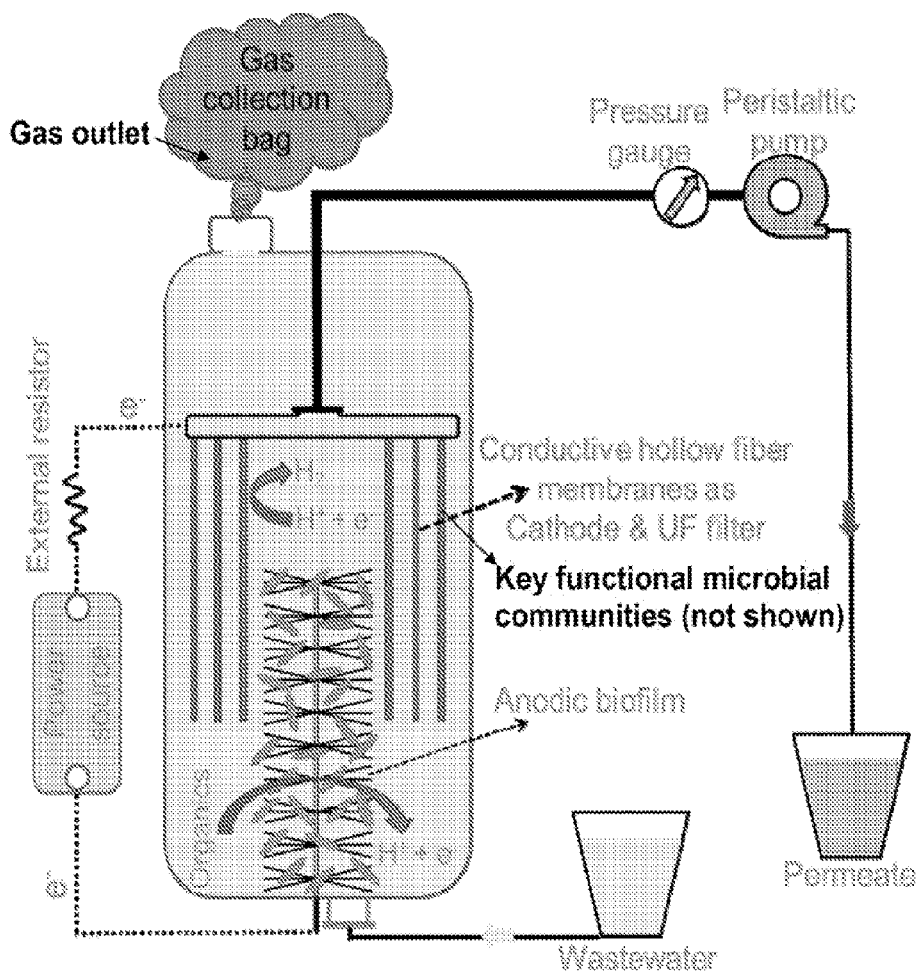
FIG. 1 is a schematic representation of the anaerobic electrochemical membrane bioreactor with associated components.

Disclosed herein is a design of a wastewater treatment technology and a process for wastewater treatment to: i) recover energy from low strength wastewaters in the form of biogas; ii) treat wastewater and iii) reclaim water. The technology integrates the known principles for the biocatalysed production of hydrogen from biologically oxidizable organic material in a bioelectrochemical system and membrane filtration. The invention is termed the anaerobic electrochemical membrane bioreactor (AnEMBR).

An AnEMBR can include a vessel which is the housing into which waste water is introduced, an anode electrode in the vessel suitable for supporting a first electrochemically active microorganism that oxidizes organic compounds in the wastewater, and a cathode membrane electrode in the vessel suitable for catalyzing the hydrogen evolution reaction to generate hydrogen and supporting hydrogenotrophic methanogens that anaerobically generates an energy containing $CH_4$ gas from $H_2$ and $CO_2$, wherein the cathode membrane electrode includes a membrane structure configured to pass a liquid through the membrane while retaining the key functional microorganisms in the vessel. The EAB at the anode produce electrons, $CO_2$ and protons ($H^+$) from the oxidation of organic compounds, for example, acetate. The electrons are transferred to the anode to generate an electric current as electrons are shuttled through an external electric circuit to the cathode. Hydrogen gas is produced at the cathode electrode when the electrons and protons meet at the cathode electrode surface. The vessel includes an inlet configured to supply the liquid into the vessel and an outlet configured to remove the liquid from the vessel after the liquid passes through the cathode membrane electrode. A pump can be arranged to remove the liquid from the outlet. The vessel can further include a gas outlet where a gas collector is connected. Biogas generated from the process and collected in the gas collector.

The conductive porous membrane-cathode electrodes can be made of a material capable of catalyzing the hydrogen evolution reaction such as, but not limited to, stainless steel, platinum, nickel, copper, iron, palladium, gold, silver, cobalt, molybdenum, manganese, carbon and its various forms such as activated carbon, graphite, and graphene, or any combination thereof. The anode electrode can be a structure with high surface area (e.g. brush). The cathode membrane can be made of one or more of hollow fibers including a plurality of pores. The pore size is such that the electrochemically active microorganism and other members of the vital essential microbial communities are retained in side of the membrane while the treated water can pass though the pore to the outlet. The reactor can further comprise a pump arranged to remove the liquid (i.e. treated water) from the outlet.

Bioelectrochemical systems typically contain two electrodes housed in a vessel. These electrodes may be housed in separate compartments or within the same vessel. If they are housed in separate compartments they are typically separated by an ion permeable membrane. The anode contains electrochemically active microorganisms that oxidize organic or inorganic material present in the vessel or anode compartment. The electrons liberated from the oxidation process are transferred to the anode (working electrode). The anode is electrically connected to the cathode (counter) electrode where the reductive cathodic reaction occurs. The cathode membrane electrode may also contain other electrochemically active microorganisms that produce an energy containing gas, for example, methane from hydrogen produced at the cathode surface. Due to these two reactions, namely the oxidative anodic and reductive cathodic reactions, electrons flow from the anode to the cathode. The EAB and hydrogenotrophic communities can form key functional microbial communities for the bioreactor. The first key microbial communities can be EAB and fermenters (if fermentable substrates are present). Examples of microorganisms that can be linked with acetate oxidation to current generation are the *Geobacter* species: *G. sulfurreducens, G. psychrophilus, G. lovley* etc. as well as acetate oxidizing sulfur and sulfate reducing bacteria such as *desulfovibrio* and *desulfuromonas* species. If fermentable substrates (e.g. propionate) are present, species from the genus *bacteroides* and phylum firmicutes can play a synergistically important role in producing acetate as a by-product from fermentation that EAB communities can oxidize. The second key microbial community can be a methanogenic archaea, for example hydrogenotrophic methanogens. Examples of the possible hydrogenotrophic methanogens that can be present include: *Methanobrevibacter* species, such as *M. arboriphilicus* and *M. ruminantium*, and *Methanobacterium* species, such as *M. congolense* and *M. swan*.

A liquid or solution (fuel/electrolyte) can be fed to the vessel containing the anode and cathode membrane electrodes or different liquids or solutions can be fed to the separate compartments in the case of a system with two compartments, one containing the anode and the other containing the cathode. Appropriate feeding and removing arrangements can be provided in order to feed and remove the liquid or solutions.

To maintain the electrical circuit and electrical charge balance (electroneutrality) in the bioelectrochemical system, ions need to flow between the anode and cathode membrane electrodes. Anions may pass from the cathode to the anode or cations may pass from the anode to the cathode. In the case of separate compartments, the ion permeable membrane facilitates transport of these ions.

Bioelectrochemical systems can be modified to incorporate membrane filtration as a means to purify the treated effluent. In such a modification the conductive cathode membrane electrode serves as both the cathode membrane electrode and membrane filter. The cathode can be engineered to exhibit pore sizes that enable micro- or ultrafiltration. These porous cathodic membranes allow the treated water to pass through the membrane while retaining particulate matter of sizes similar to that of microorganisms (for example, bigger than 0.5 µm, bigger than 1 µm, or bigger than 10.0 µm) in the reactor. This membrane filtration produces an effluent with high water quality standards.

A modified bioelectrochemical system incorporating membrane filtration exhibits an operating principle similar to that of a membrane bioreactor. See, for example, PCT Publication No. WO 2011/111879, which is incorporated by reference in its entirety. A membrane bioreactor can be comprised of a reactor with micro- or ultrafiltration membranes incorporated into the vessel. In the case of wastewater treatment, wastewater is fed into the reactor and retained for a period of time to allow the microorganisms present to treat the wastewater. The treated water is drawn across the membranes while particulate matter and microorganisms are retained in the reactor. Membrane bioreactors can be operated as aerobic systems or as anaerobic systems. The membranes in the anaerobic electrochemical membrane bioreactor presented here function as both a conductive electrode and as a membrane filter. In this respect, the AnEMBR is different to an anaerobic membrane bioreactor in which the membranes function only as a membrane filter.

Membrane bioreactors (MBRs) are wastewater treatment technologies that incorporate a permselective membrane within a biological treatment process. This enables wastewater treatment and solids separation in the same reactor. See, S. Judd, *Trends in Biotechnology*, 2008, 26, 109-116, which is incorporated by reference in its entirety. The advantages of membrane bioreactors include a smaller footprint compared to conventional AS treatment processes and they produce effluents with high water quality, that are suitable for water reuse, in a single step. See, P. L. McCarty, J. Bae and J. Kim, *Environmental Science & Technology*, 2011, 45, 7100-7106, which is incorporated by reference in its entirety. The disadvantage is that these systems are energy intensive, using on the order of 1-2 kWh/m$^3$ of wastewater treated when operated aerobically, and they are prone to fouling of the membranes. See, B. E. Logan and K. Rabaey, *Science*, 2012, 337, 686-690, which is incorporated by reference in its entirety. Anaerobic membrane bioreactors (AnMBRs) have lower energy demands (0.25-1 kWh/m$^3$ with internal submerged membranes) since they do not require aeration and can produce methane gas but show a similar propensity for membrane fouling. See, B.-Q. Liao, J. T. Kraemer and D. M. Bagley, *Critical Reviews in Environmental Science and Technology*, 2006, 36, 489-530, and A. Achilli, E. Marchand and A. Childress, *Water Science & Technology*, 2011, 63, 2999-3005, each of which is incorporated by reference in its entirety.

Membrane bioreactors are advantageous since the reactors generally require a smaller volume and occupy smaller footprints than traditional aerobic wastewater treatment systems. Traditional aerobic wastewater treatment requires aeration of a large tank to encourage biological treatment of the wastewater. This treated water is then fed to large settling tanks to allow large particulates to settle out and the treated water finally passes through a multi-media filtration step to remove the smaller particulates and microorganisms. These traditional wastewater treatment systems require large volumes of water and occupy large footprints.

Anaerobic digestion (AD) is a well-established technology with the potential to provide energy positive wastewater treatment by producing methane gas. Anaerobic processes also produce less excess sludge than aerobic processes (0.08 kg versus 0.4 kg per kg oxidised COD) which minimizes the cost associated with solids disposal. See, K. Rabaey and W. Verstraete, Trends in Biotechnology, 2005, 23, 291-298, which incorporated by reference in its entirety. This technology is best suited for high strength wastewaters though due to slow growth rates of methanogens and kinetic limitations of anaerobic metabolism associated with low strength wastewaters. See, E. Foresti, M. Zaiat and M. Vallero, Reviews in Environmental Science and Bio/Technology, 2006, 5, 3-19, which is incorporated by reference in its entirety.

Bioelectrochemical systems can be operated in fuel cell mode (see PCT Publication No. WO 2013/069889, which is incorporated by reference in its entirety), in which case the electrode reactions are thermodynamically favorable and electrical energy is produced, or in electrolysis mode (see PCT Publication No. WO 2005/005981, which is incorporated by reference in its entirety), in which case the cathodic reaction for proton reduction to hydrogen gas is thermodynamically unfavorable, thus electrical external energy is provided to the bioelectrochemical system. The invention described here is based on operation in electrolysis mode.

Anaerobic processes based on bioelectrochemical systems (BES) such as microbial fuel cells (MFCs) and microbial electrolysis cells (MECs) hold promise for the treatment of low-strength wastewaters, such as domestic wastewater, with concomitant energy recovery. Bioelectrochemical systems use bacteria capable of transferring electrons exogenously to convert soluble organic matter present in the wastewater directly into electricity or hydrogen. A MFC or MEC contains an anode electrode which bacteria use as the terminal electron acceptor for the oxidation of organic matter. The electrons are shuttled to the cathode via an electrical circuit where, in the case of a MFC, oxygen is reduced to water, or protons are reduced to form hydrogen in a MEC. The hydrogen evolution reaction (HER) does not proceed spontaneously and therefore a small amount of power needs to be added by an external power source to overcome the thermodynamic barrier. See, H. Liu, S. Grot and B. E. Logan, Environmental Science & Technology, 2005, 39, 4317-4320, and R. A. Rozendal, H. V. M. Hamelers, G. J. W. Euverink, S. J. Metz and C. J. N. Buisman, International Journal of Hydrogen Energy, 2006, 31, 1632-1640, each of which is incorporated by reference in its entirety. In theory, an applied voltage of 0.114 V is needed under standard biological conditions but in practice the applied voltage is typically higher. See, D. Call and B. E. Logan, Environmental Science & Technology, 2008, 42, 3401-3406, which is incorporated by reference in its entirety. Methane can also be generated in MECs predominantly through hydrogenotrophic methanogenesis. See, P. Parameswaran, C. I. Tones, H. S. Lee, R. Krajmalnik-Brown and B. E. Rittmann, Biotechnology and Bioengineering, 2009, 103, 513-523, which is incorporated by reference in its entirety.

Bioelectrochemical systems are effective at treating low strength wastewaters, and they can also be operated at temperatures below 20° C., a temperature not suitable for the growth of methanogenic archaea. See, Z. Ge, J. Li, L. Xiao, Y. Tong and Z. He, *Environmental Science & Technology Letters*, 2013, which is incorporated by reference in its entirety. These advantages provide a specific niche for the application of bioelectrochemical systems for the treatment of low strength wastewaters. The predominant electricity producing bacterium in BES, *Geobacter sulfurreducens*, is able to outcompete acetoclastic methanogens for intermediates of the AD process, mainly acetate at low concentrations, due to its higher substrate affinity (low Ks value) and higher growth yield than methanogens. See, S. Jung and J. Regan, Applied and Environmental Microbiology, 2011, 77, 564, which is incorporated by reference in its entirety. As a result the overall start up time for BES is shorter than AD. These advantages provide a specific niche for the application of BES for the treatment of low strength wastewaters with simultaneous energy recovery. The performance of MECs has improved rapidly in just a few years but on their own, these systems are not able to produce the high quality effluent that is needed for water reuse applications. For this reason they would need a post treatment step or incorporate a separation stage in the process.

A significant challenge that impacts the performance of membrane bioreactors, whether operated aerobically or anaerobically, is membrane fouling. Membrane fouling is the deposition of foulant materials, such as the growth of bacterial biofilms, onto the surface of the membrane as well as the adsorption of these materials within the pore matrix of the membrane. Membrane fouling increases hydraulic resistance of the membranes which negatively affects the performance of these systems and increase operational and capital costs. Common approaches that are used to reduce biofouling include i) creating turbulence near the surface of the membrane by using air (aerobic membrane bioreactors) or ii) backflushing the membrane with gas or liquid (anaerobic membrane bioreactors) to remove the accumulated foulants. Chemical cleaning is also commonly used. Each of these mitigation measures has an associated cost which in some cases can be quite high.

The anaerobic electrochemical membrane bioreactor which is operated in electrolysis mode may provide a solution to the phenomenon of membrane fouling. In this mode of operation hydrogen is evolved at the porous cathodic membranes in the form of bubbles. The formation of these bubbles can potentially provide sufficient shearing force to prevent the formation of this fouling layer at the membrane surface as well as expel foulants from the pores of the membrane. The imposed potentials of the cathodic membranes and localized high pH at the cathodic membranes surface also minimize biofouling.

Hydrogen gas evolution as bubbles from cathode membrane electrode surface of an anaerobic electrochemical membrane bioreactor can act as a natural scouring mechanism to mitigate biofouling of the surface of the electrode. The rate of hydrogen generation from cathode membrane electrode surface can further affects the mitigation phenomenon of biofouling. Alkaline pH and low electric cathode membrane electrode electric potential during hydrogen evolution reaction can also be adjusted to mitigate the biofouling.

The predominant microbial communities involved in biofouling of cathode membrane electrode surface is hydrogenotrophic methanogens. The environmental niche in the system favors the hydrogenotrophic methanogens in the vessel and allow to cultivate and enrich the hydrogenotrophic methanogens in the vessel. The enriched hydrogenotrophic methanogens in the vessel are useful for further biotechnological applications such as biofuel ($CH_4$) generation through $CO_2$ sequestration.

The anaerobic electrochemical membrane bioreactor may also provide a means of cultivating microorganisms capable of converting hydrogen to methane gas. These microorganisms are known as hydrogenotrophic methanogens. In anaerobic digestion systems that are commonly used to treat high strength wastewaters for the production of biogas, these microorganisms are responsible for keeping the partial pressures of hydrogen at low enough levels to allow the bio-chemical reactions that produce methane gas to proceed. Hydrogenotrophic methanogens are slow growing and challenging to cultivate, therefore a system that can effectively and efficiently cultivate high cell numbers of these microorganisms in a short period of time without the need for strictly anaerobic and sterile conditions would be of significant commercial interest for $CO_2$ capture (but not sequestration).

Though energy input is required to drive the hydrogen evolution reaction at the cathode membrane electrode, the high energy density of the produced biogas and the energy savings from not having to provide aeration, as well as the potential savings from membrane fouling mitigation make the anaerobic electrochemical membrane bioreactor a feasible solution to the energy and maintenance challenges posed by traditional wastewater technologies. In addition, since the non-noble metal-based conductive cathode membranes do not require expensive, noble metal catalysts, such as platinum, to be coated to the electrode surface to catalyze the hydrogen evolution reaction, this type of cathode can be cost effective.

A number of studies have reported systems that integrate membrane bioreactors with bioelectrochemical systems, particularly microbial fuel cells, in an effort to leverage the benefits of both technologies. See, L. Malaeb, K. P. Katuri, B. E. Logan, H. Maab, S. P. Nunes and P. E. Saikaly, *Environmental Science & Technology*, 2013, Y.-K. Wang, G.-P. Sheng, B.-J. Shi, W.-W. Li and H.-Q. Yu, *Scientific Reports*, 2013, Y.-P. Wang, X.-W. Liu, W.-W. Li, F. Li, Y.-K. Wang, G.-P. Sheng, R. J. Zeng and H.-Q. Yu, *Applied Energy*, 2012, 98, 230-235, J. Liu, L. Liu, B. Gao and F. Yang, *Journal of Membrane Science*, 2013, 430, 196-202, Y.-K. Wang, G.-P. Sheng, W.-W. Li, Y.-X. Huang, Y.-Y. Yu, R. J. Zeng and H.-Q. Yu, *Environmental Science & Technology*, 2011, 45, 9256-9261, Z. Ge, Q. Ping and Z. He, *Journal of Chemical Technology & Biotechnology*, 2013, 88, 1584-1590, and Y. Tian, C. Ji, K. Wang and P. Le-Clech, *Journal of Membrane Science*, 2014, 450, 242-248, each of which is incorporated by reference in its entirety. In most cases these systems were not truly integrated but used separate processes in the same reactor. Recently, Malaeb et al. reported a hybrid system that incorporated a conductive ultrafiltration membrane biocathode within a microbial fuel cell. This system removed COD, $NH_3$—N and suspended solids efficiently to produce a high quality effluent.

Figure 2:
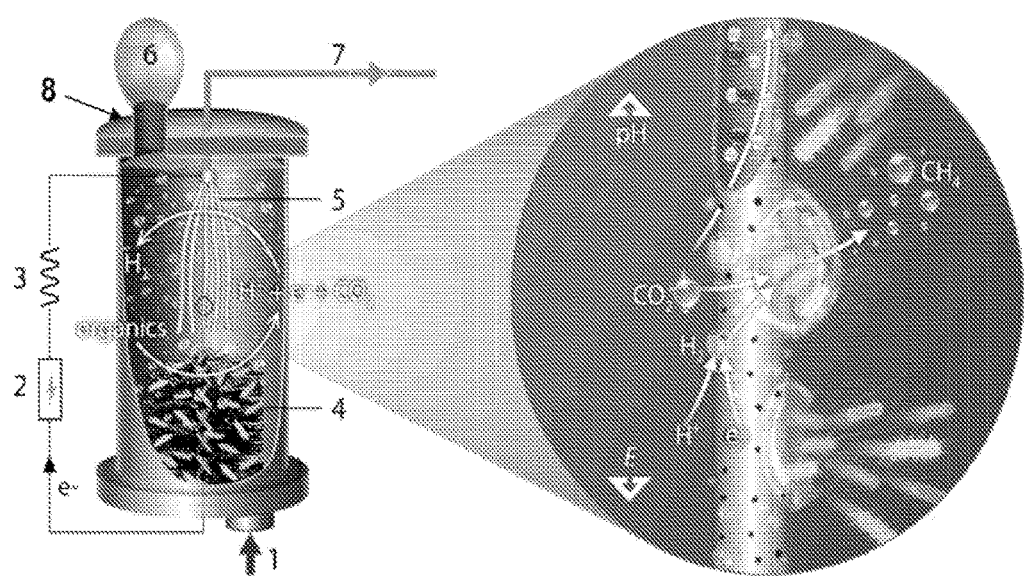
FIG. 2 is a schematic representation of the anaerobic electrochemical membrane bioreactor (1. inlet, 2. power supply, 3. 10Ω external resistor, 4. anode, 5. Ni-HFM cathode and key functional microbial communities (not shown), 6. gas collector, 7. outlet, 8. gas outlet).
Figure 13:
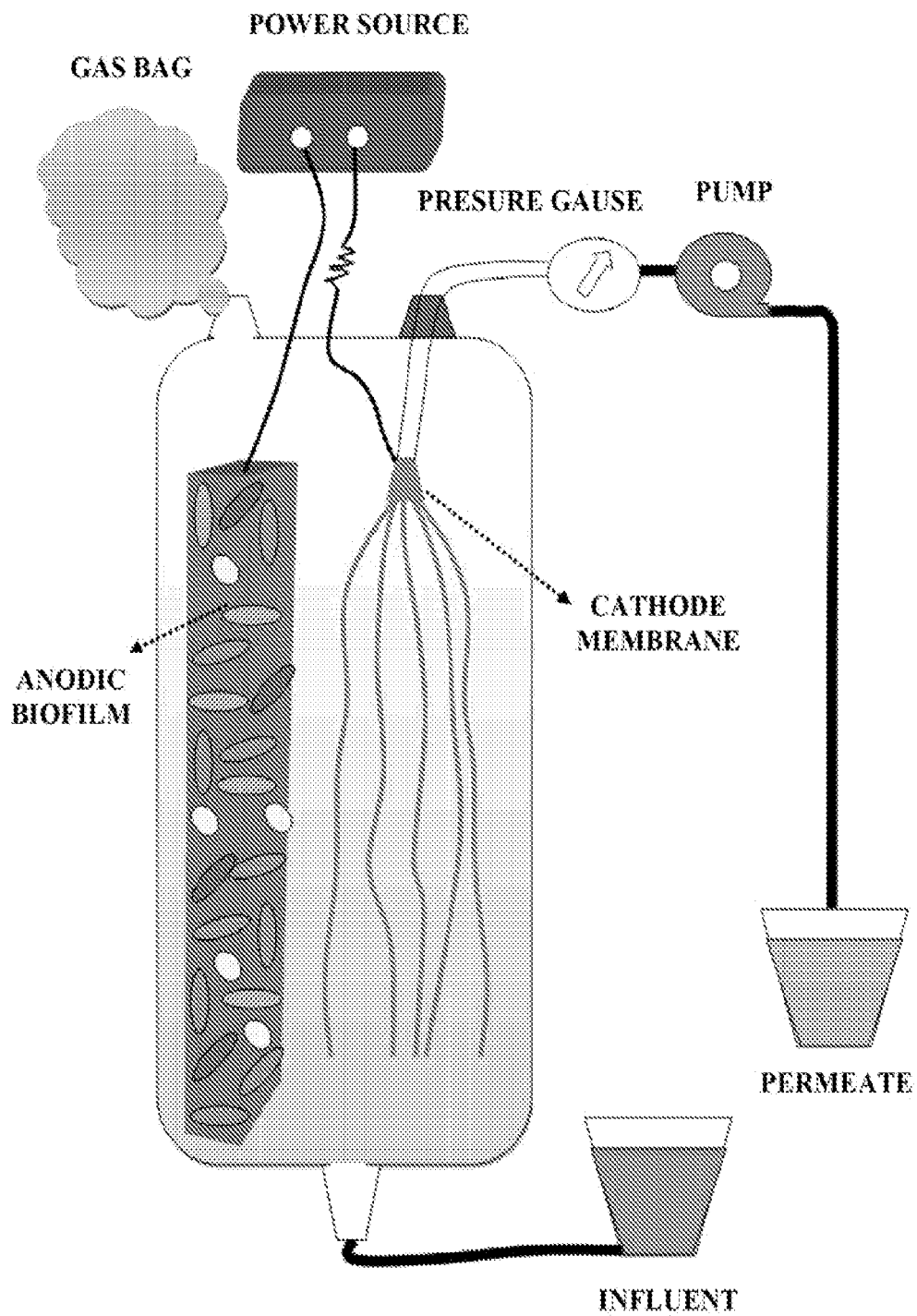
FIG. 13 is a schematic representation of the anaerobic electrochemical membrane bioreactor with associated components.

Here the operating principles of a microbial electrolysis cell are integrated with those of a MBR to recover the energy from wastewater directly as biogas in what is called an anaerobic electrochemical membrane bioreactor (AnEMBR) (FIGS. 1, 2 and 13). The advantage of this approach is that the energy recovered from the wastewater can be stored and used when needed and the product water is suitable for direct water reuse applications. The cathode was configured using nickel-based hollow-fiber membranes (Ni-HFMs) containing an average pore size of 1 micron (see FIGS. 3A-3C).

Components and Assembly

FIGS. 1 and 13 are schematic representations of the anaerobic electrochemical membrane bioreactor vessel and associated components. Each of these components is described in detail in the following sections. An anode electrode can be surrounded by a cathode electrode (FIG. 1), or a cathode electrode can be surrounded by an anode electrode (figure not shown). FIG. 2 shows another schematic representation of the anaerobic electrochemical membrane bioreactor with detailed description of a nickel-based hollow-fiber membranes (Ni-HFMs) (1. inlet, 2. power supply, 3. 10Ω external resistor, 4. anode, 5. Ni-HFM cathode, 6. gas collector, 7. outlet, 8. gas outlet). A cathode electrode and an anode electrode can be positioned vertically (FIG. 2) or horizontally next to each other (FIG. 13) in the vessel.

1. Reactor/Housing/Vessel

In the embodiment of the anaerobic electrochemical membrane bioreactor system can have a single tubular vessel containing an anode electrode and a cathode membrane electrode within the same vessel is assembled vertically. The reactor and electrode design of the anaerobic electrochemical membrane bioreactor is not limited to the designs which are described here. There is no separating material between the anode and cathode membrane electrodes. The vessel can be made of any suitable plastic or poly(methyl methacrylate) (PMMA) or polycarbonate material to provide sufficient strength. Plates are attached to the top and bottom of the vessel and sealed with epoxy glue to make the vessel air and water tight. The reactor is held in place using stainless steel bolts that extend through the top and bottom plates and wing nuts. These plates can be made from the same material or any other suitable plastic material that provides sufficient strength. These plates are used for inserting the electrodes and for feeding and removing liquid or solution from the vessel. Additional ports can be drilled into the wall of the vessel at strategically identified locations for inserting additional components such as reference electrodes.

A schematic representation of the reactor is shown in FIG. 13. Four single chamber, rectangular reactors were constructed from plexiglass. The reactors consisted of a central housing (14.5×5×5 cm) with an internal liquid volume of 183 mL (12.5×3×5 cm) and two solid end plates (14.5×5 cm). The final working liquid volume of each reactor was 165 mL. The headspace of the reactor was approximately 18 mL. The anode electrode was prepared from non-wet proofed carbon cloth (CC-B1DBN40, Clean Fuel Cell Energy, LLC, FL, USA) that was cut to fit on one side of the reactor, with a projected surface area of 35 $cm^2$ (22.7 $m^{-1}$). Prior to assembly, the anode electrode was held in position on one side of the housing using a silicone adhesive that was spread around the edge of the reactor housing. A piece of titanium foil (1.5×2.5 cm) was used as a current collector and positioned on one edge midway along the reactor housing. To ensure a good electrical connection, the area below the titanium current collector was not coated with silicone adhesive.

The cathode consisted of five graphene coated Ni-HFMs bundled together using copper wire and conductive silver epoxy. Each fiber was 10 cm long with an outer diameter of 0.09 cm, with a surface area of 2.8 $cm^2$ per fiber. The copper wire was fed through a port on the top of the reactor and used as the cathode connection. Each fiber was sealed at the bottom end with a drop of epoxy. A piece of silicone tubing was placed over the top of the fibers up to the point of connection and the juncture was covered with epoxy to create a water tight membrane module, and avoid exposure of the copper wire to solution. The ends of the fibers located within the silicone tubing were left open to allow for filtration. The total surface area to volume ratio of the cathode was 8.6 $m^2/m^3$, compared to 4 $m^2/m^3$ used in previous tests. The silicone tube at the top of the cathode electrode was inserted into a second tube with a larger diameter and guided through a hole located at the top of the housing. The tube was fixed in place using epoxy glue with the cathode fibers positioned approximately 1.5 cm from the anode. The tubing was connected to a peristaltic pump for filtration. Silicone gaskets were placed between the end plates and the housing to ensure a tight seal and to prevent oxygen leaking into the reactor. A port located near the bottom of the housing was used as the inlet and outlet for feeding and sampling the reactor. The gas bag was positioned at the top of the reactor and connected to the reactor using black tubing (10 cm) via a tubing connector inserted into a 10 mm diameter threaded port on the top of the housing. A reference electrode (Ag/AgCl, MF-2052, BASi) was placed between the anode and cathode electrodes in a vertical orientation through a hole on the top of the housing to measure the anode potential. Care was taken to ensure all connections were well sealed with non-conductive epoxy.

The reactors (in duplicate) were started up at an applied voltage of 0.7 V or 0.9 V and fed with medium containing 10 mM acetate for the first three cycles, until steady current generation was observed. Anaerobic digester sludge (10% v/v, Manfouha Wastewater Treatment Plant, Riyadh, KSA) was used as inoculum. After this, the acetate concentration was reduced to 5 mM (320 mg/L COD) to provide an organic matter concentration more similar to domestic wastewater. Two reactors were operated under fed-batch conditions for 20 days at room temperature (25° C.) prior to obtaining experimental results. The applied voltages were not changed, except as noted. The theoretical hydraulic retention time (HRT) was set at 48 hours (0.7 V) or 24 hours (0.9 V), to provide comparable COD removals with the different applied voltages. An external power source (3645A; Circuit Specialists, Inc., AZ) was used to apply voltage to the circuit, and a data logger (ADC 24, PicoLog, UK) was connected to monitor the voltage across an external resistor ($R_{ex}=10\Omega$) to calculate current. At the end of selected batch cycles, when the voltage dropped to within 10% of the peak voltage, the treated medium was filtered through the cathode filters using a peristaltic pump (Masterflex L/S, Cole-Parmer, Vernon Hills, Ill.) at a permeate flux of 6.9 $L/m^2$-h (LMH). The transmembrane pressure (TMP) of the membrane filters was measured by means of a pressure transducer (68075-32, Cole-Parmer Instrument Company) attached to the filtrate line, and recorded using a data acquisition system (LabVIEW, National Instruments) connected to a computer. A new cycle was started after the remaining liquid was drained and fresh medium was pumped into the reactor.

2. Anode Electrode

In the embodiment of the anaerobic electrochemical membrane bioreactor described here, the anode is a graphite fiber brush with the bristles of the brush wound into a titanium core. The anode electrode design is not limited to that which is described here and any carbon-based material can be used. This type of anode electrode is commercially available. The anaerobic electrochemical membrane bioreactor is not limited to this type of anode electrode. In the embodiment of the anaerobic electrochemical membrane bioreactor described here, the anode is positioned at the bottom of the vessel. The titanium core of the anode electrode extends through the bottom plate to provide a connection point. Epoxy glue is used to seal the electrode in place and prevent air from entering the vessel at the point where the titanium core of the anode electrode enters the plate. The anode contains electrochemically active microorganisms. The source of these electrochemically active microorganisms can be various wastewaters (domestic or industrial) and anaerobic sludge from digesters.

3. Cathode Membrane Electrode

The cathode membrane electrode of the anaerobic electrochemical membrane bioreactor presented here is comprised of porous nickel hollow fiber membranes (Ni-HFMs). Flat sheet membranes can be used in devices to afford a similar function. The Ni-HFMs are comprised of almost pure nickel (99.9%) with a small percentage of unknown content (0.1%). Nickel offers a lower cost alternative to platinum based catalysts and has better electrochemical activity compared to most other non-noble metal catalysts. See, A. W. Jeremiasse, H. V. M. Hamelers, M. Saakes and C. J. N. Buisman, *Int. J. Hydrogen Energy,* 2010, 35, 12716-12723, which is incorporated by reference in its entirety. In one embodiment, each fiber was 10 cm long with inner and outer diameters of 0.83 and 0.90 mm, respectively, giving a surface area of 2.8 $cm^2$ per fiber. Ni-HFMs fibers were connected together at one end using electrically conductive silver epoxy and positioned above the anode (graphite fiber brush). The number of these fibers can be one or more than one. Ni-HFMs were fabricated using a combined phase-inversion/sintering method (see below for more details). Characterization by x-ray diffraction revealed three diffraction peaks, corresponding to Ni [111], [200], [220] planes (JCPDS #04-0850), respectively (see FIG. 3D). These membranes can be coated with selected materials, such as graphene, or they can be used in their native, uncoated form. The Ni-HFMs are porous and the pore size of the Ni-HFMs can be varied by using Ni powders with smaller particles and by increasing the annealing temperature. The preferred pore size for this application is less than 1 micron with an ideal pore size of less than 0.45 micron. The use of hollow fiber membranes enables a greater packing density which provides a higher membrane surface area per unit volume. In an optimized design this increased surface area can reduce ohmic losses and facilitate higher permeate fluxes.

In the embodiment described here, the Ni-HFMs are electrically connected by bundling the membranes together using a conductive epoxy. They are positioned above the anode electrode and are inserted into a silicone (or some alternative) tube which extends through the top plate of the vessel. The positioning of the membranes is not limited to this position and variations to this configuration can be adopted, for example, positioning the Ni-HFMs in a circular arrangement surrounding the anode electrode. The tubing into which the Ni-HFMs are inserted is connected to an electricity powered pump located alongside the reactor. This pump is used to draw the electrolyte/fluid/solution through the Ni-HFMs as permeate. The person skilled in the art will appreciate that the cathode is not limited to this metal or this configuration and that flat sheet or tubular membranes can be used in this system.

NiHFM Fabrication Process

Ni-HFMs were fabricated using a combined phase-inversion/sintering method. Nickel powders, 1-methyl-2-pyrrolidinone (NMP, HPLC grade, 99.5%, Alfa Asea), Polyether Sulfone (PES, Ultrason® E6020P, BASF) and Polyvinylpyrrolidone (PVP, Alfa Asea) were mixed and well dispersed by ball milling for 18 h, followed by degassing under vacuum for 24 h. After that, the suspension was extruded through a spinneret using water as the inner and outer coagulant. The black body of the hollow fiber was dried at room temperature and then sintered at 560° C. for 6 h to remove organic compounds in air flow of 500 mL/min. After cooling to room temperature, the fiber was reduced from the metal oxide state to the metal state at 810° C. for 6 h in pure hydrogen of 500 mL $min^{-1}$. See B. Meng, X. Tan, X. Meng, S. Qiao and S. Liu, *Journal of Alloys and Compounds,* 2009, 470, 461-464, which is incorporated by reference in its entirety.

Figure 3:
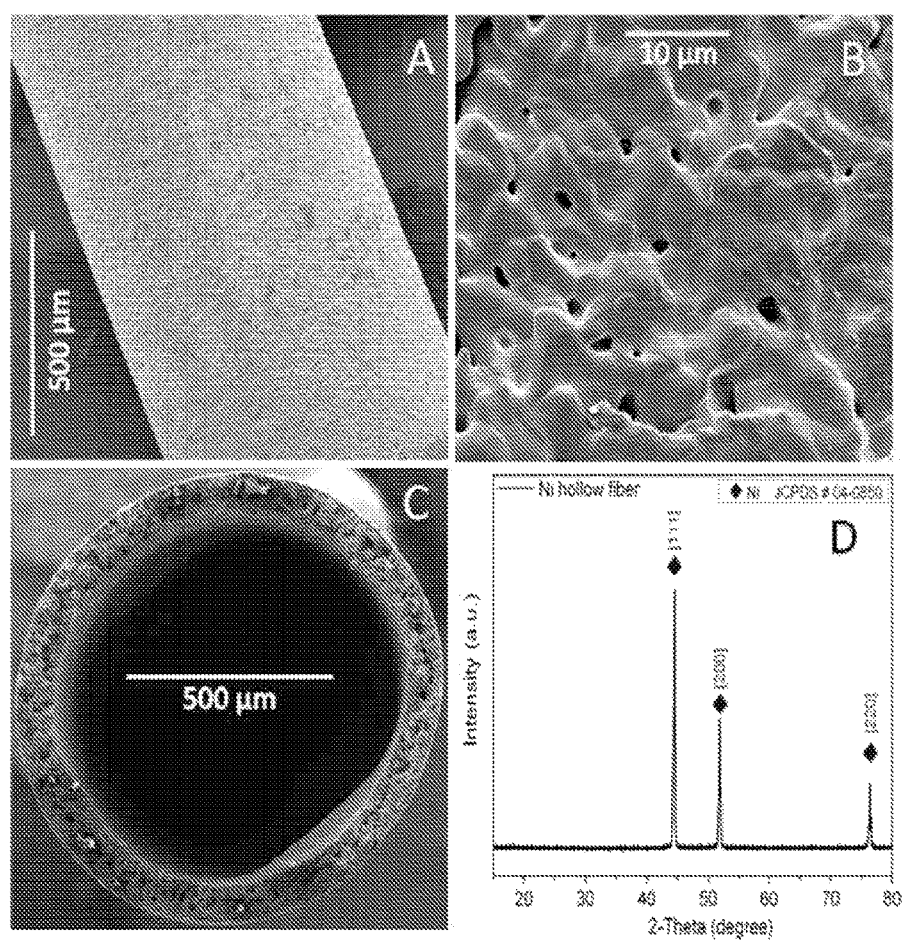
FIG. 3 is a series of scanning electron micrographs of a virgin nickel hollow fiber membrane showing the outer surface of the membrane (A), a close-up of the outer surface with pores visible (B) and a cross section of the fiber (C).
Figure 18:
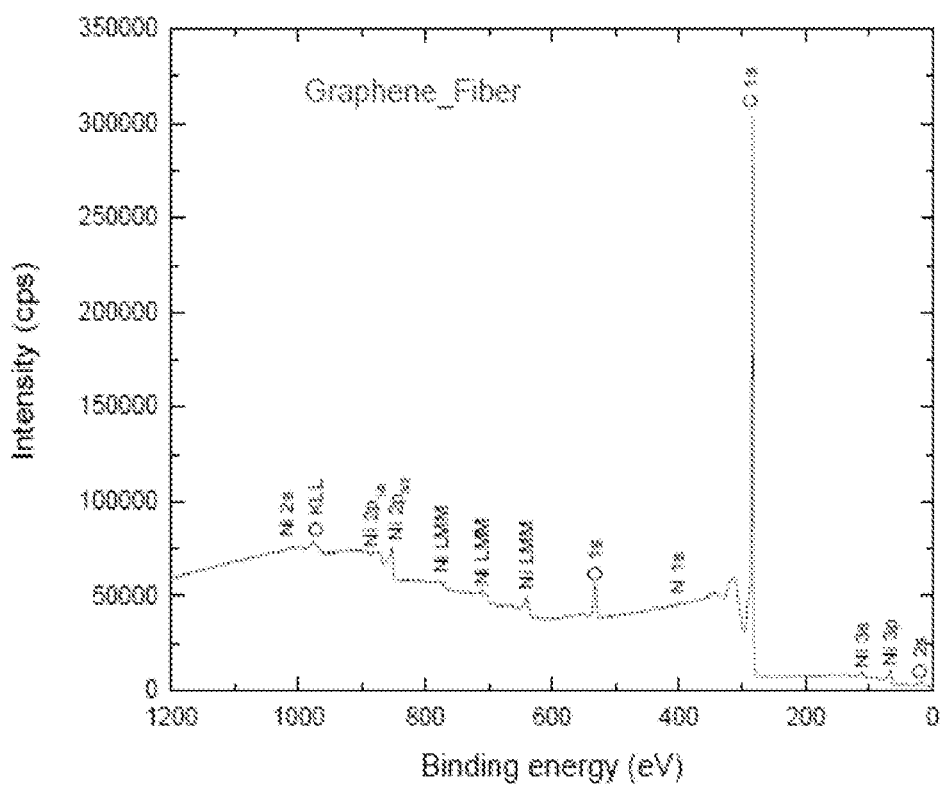
FIG. 18 is a graph depicting X-ray photoelectron spectroscopy spectrum of the graphene coated Ni-HFM showing greater than 96% C covering the HFM surface.

Alternatively, nickel powders were mixed with 1-methyl-2-pyrrolidinone, polyether sulfone and polyvinylpyrrolidone and the suspension was extruded through a spinneret using water as the inner and outer coagulant. The hollow fiber was dried at room temperature and then sintered at high temperature to remove organic compounds. After cooling, the fiber was reduced from the metal oxide state to the metal state at 810° C. for 6 h in pure hydrogen. The Ni hollow fiber was then purged with methanol, isopropanol, and deionized water in series and dried at 100° C. in a tube furnace under N2 atmosphere. After evacuation of the chemical vapor deposition (CVD) chamber (quartz tube), the clean Ni hollow fiber was heated to 1000° C. in the forming gas (H2/Ar, 200/500 mL min-1) and held at this temperature for 15 min to reduce the surface oxide layer. After reduction, the Ni hollow fiber was exposed to the mixture of acetylene (22 mL/min) and $H_2$ (495 mL/min) at 1000° C. for 5 min and then cooled in a tube furnace with Ar. The graphene coated, nickel-based HFM (Ni-HFM) had an average pore size of 1 µm (FIG. 3). X-ray photoelectron spectroscopy (XPS) results confirmed the graphene coating and showed 96% C coverage of the surface (FIG. 18).

4. Power Supply or Potentiostat

The hydrogen evolution reaction is a thermodynamically unfavorable reaction and requires energy to proceed. This energy can be provided by i) an external power supply instrument that can be used to provide additional voltage between the anode and cathode membrane electrodes or ii) a potentiostat which is an electrochemical instrument required to control a three electrode electrochemical cell. The three electrodes refer to the anode, cathode and reference electrodes. A potentiostat can be used to hold the electrochemical potential of a chosen electrode steady at a selected value relative to a reference electrode positioned near to the electrode being controlled. Both the power supply and potentiostat are commercially available hardware devices.

5. Reference Electrode

A reference electrode is an electrode that has a well-characterized electrode potential which is stable and well-known. A reference electrode is used to measure or maintain the electrochemical potential of a selected electrode. The reference electrode used in the system described here was Ag/AgCl (BASI).

6. Peristaltic Pump and Pressure Gauge

The peristaltic pump is used to draw the solution through the cathode membrane filters at the end of a batch cycle. A pressure gauge positioned between the hollow fibers and peristaltic pump enables the operator to measure the transmembrane pressure (TMP). The TMP can be used as an indication of the degree of fouling of the membrane since TMP will increase as fouling of the membrane increases.

Advantages of the Anaerobic Electrochemical Membrane

The primary goals of the anaerobic electrochemical membrane bioreactor are i) energy recovery from low strength wastewaters in the form of biogas, ii) wastewater treatment and iii) water reclamation. The anaerobic electrochemical membrane bioreactor has been designed and operated in order to demonstrate an alternative approach to conventional wastewater treatment technologies that are widely used in the world today. These conventional technologies require intensive aeration to provide sufficient oxygen for biological treatment to occur. Aeration is not required in the anaerobic electrochemical membrane bioreactor and therefore the energy associated with aeration is essentially saved. The production of a valuable energy carrying biogas has the potential to make the anaerobic electrochemical membrane bioreactor an energy positive wastewater treatment technology.

The electrochemical membrane bioreactor system converts chemical energy present in low-strength wastewater to usable, renewable and carbon-neutral biogas in a single step process. The reactor design is simple and compact which reduces the carbon footprint associated with construction. The start-up time of the process is fast and steady-state can be achieved rapidly which is an advantage over conventional anaerobic treatment systems. The energy recovery in the form of biogas is faster compared to the anaerobic membrane bioreactor (control) reactor. More effective treatment of low strength wastewaters than conventional anaerobic digestion processes because the apparent $K_s$ (half-saturation constant), reported for a range of organic substrates is low (see, Rabaey, K. 2010. *Bioelectrochemical systems: from extracellular electron transfer to biotechnological application*. Intl Water Assn, which is incorporated by reference in its entirety). For example, the dominant exoelectrogen (*Geobacter sulfurreducens*) in BESs has a low $K_s$ value (0.64 mg COD/L) for acetate compared to acetoclastic methanogens ($K_s$, 177-427 mg COD/L) (Rabaey, 2010). Biofouling of membranes can be minimized compared to traditional membrane bioreactors. It is possible to enrich hydrogen consuming microorganisms on the surface of the conductive hollow fiber membranes to generate methane from $CO_2$. This essentially converts a biofouling layer into a biofilm that is functional and can be used for other biotechnological applications.

EXAMPLES

The anaerobic electrochemical membrane bioreactor system described here was operated in fed-batch mode with continuous recirculation of the reactor solution. The reactor solution was drawn from a port near the top of the reactor housing and circulated at a flow rate of 20 mL/min by means of a peristaltic pump to the bottom of the reactor. The recirculation of the reactor solution was performed to ensure that components in the reactor were distributed uniformly throughout the reactor in order to minimize concentration gradients.

A batch cycle was started by filling the reactor with fresh liquid/solution/electrolyte (hereafter referred to as feed) containing a known concentration of dissolved and biodegradable organic compounds, in the form of sodium acetate. In a bioelectrochemical system the measured electrical current flowing between the electrodes can be directly correlated to the concentration of organic compounds in solution. Therefore, the batch ended when the measured electrical current dropped to within 10% of the peak value. The measured electrical current was used to determine the duration of a batch cycle.

At the end of a batch cycle the reactor volume (hereafter referred to as permeate) was filtered through the cathode membrane filters for analysis. During this filtration process the transmembrane pressure was monitored using a sensor connected to an external computer to enable automatic data collection. The reactor was refilled with a fresh feed to start the next batch. This procedure was repeated several times to ensure stable performance of the system.

The anaerobic electrochemical membrane bioreactor was operated with a power supply device (voltage difference between anode and cathode set to 0.7 V) providing the additional energy needed to drive the hydrogen evolution reaction at the cathode electrode. Applied voltage by the power supply can be varied, for example, greater than 0.3 V, greater than 0.5 V, greater than 0.7 V, or greater than 0.9 V. For the purposes of comparison, an identical reactor was set up to serve as a control membrane bioreactor. This reactor was operated without an applied voltage to mimic an anaerobic membrane bioreactor. The control reactor was started in the same manner as the experimental reactor and batch cycle durations were between five and six days.

Example 1

In one example, the reactor/housing/vessel (total volume 350 mL) was filled with liquid/solution/electrolyte consisting of a buffer containing (in grams per liter): $NH_4Cl$ 1.5, $Na_2HPO_4$ 0.6, KCl 0.1, $NaHCO_3$ 2.5, $C_2H_3NaO_2$ 0.82 or 0.41 (as indicated). This solution also contains trace element solution (10 vitamin solution (10 ml/L) and selenite tungstate solution (1 ml/L) containing (in grams per liter): NaOH 0.5, $Na_2SeO_3 \cdot 5H_2O$ 0.003, $Na_2WO_4 \cdot 2HO$ 0.004. All these components were dissolved in deionized water provided by a laboratory water purification system (Millipore). The pH when added was between 6.8 and 7.

The reactor was started using graphene coated Ni-HFM cathode membranes. These were kept in place for a total of seven batch cycles (52 days operation). At the end of the seventh cycle the graphene coated Ni-HFMs cathode membranes were removed and replaced with new uncoated Ni-HFM cathode membranes.

Figure 4:
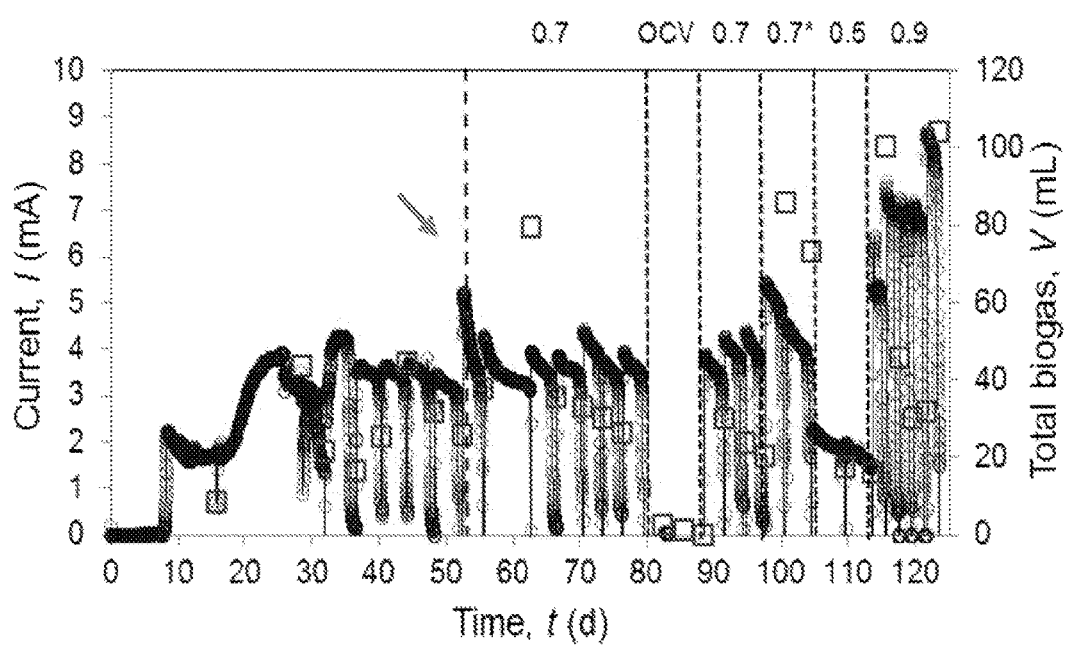
FIG. 4 is a graph depicting current produced by anaerobic electrochemical membrane bioreactor using graphene-coated Ni-HFMs and uncoated Ni-HFMs as cathode membrane filter.

FIG. 4 illustrates the current generated by the anaerobic electrochemical membrane bioreactor with both the graphene-coated and uncoated Ni-HFM cathode filters. Open red squares indicate total volume of biogas produced. The green arrow and first dotted vertical line indicate the point at which the uncoated Ni-HFMs replaced graphene-coated Ni-HFMs. The reactor was operated at an applied potential of 0.7 V using an external power supply. (Note: 0.7* indicates operation with 50 mM BES added to solution).

There was no current produced during the start-up phase as the microorganisms had not yet developed a stable electroactive biofilm. After eight days of operation the reactor began to produce current up to a maximum of 2 mA. Following the first three batch cycles (36 days) the reactor showed stable and reproducible current production of 3.5 mA over four batch cycles. The initial measured current with uncoated Ni-HFMs cathode filters peaked at 5.1 mA but dropped quickly over the course of the first batch cycle. This high peak indicates faster reaction rates with the uncoated Ni-HFMs as compared to the graphene-coated Ni-HFMs. However, subsequent cycles of operation with uncoated Ni-HFMs showed similar current profiles to that of the graphene-coated Ni-HFMs with stable current of approximately 3.5 mA.

Figure 5:
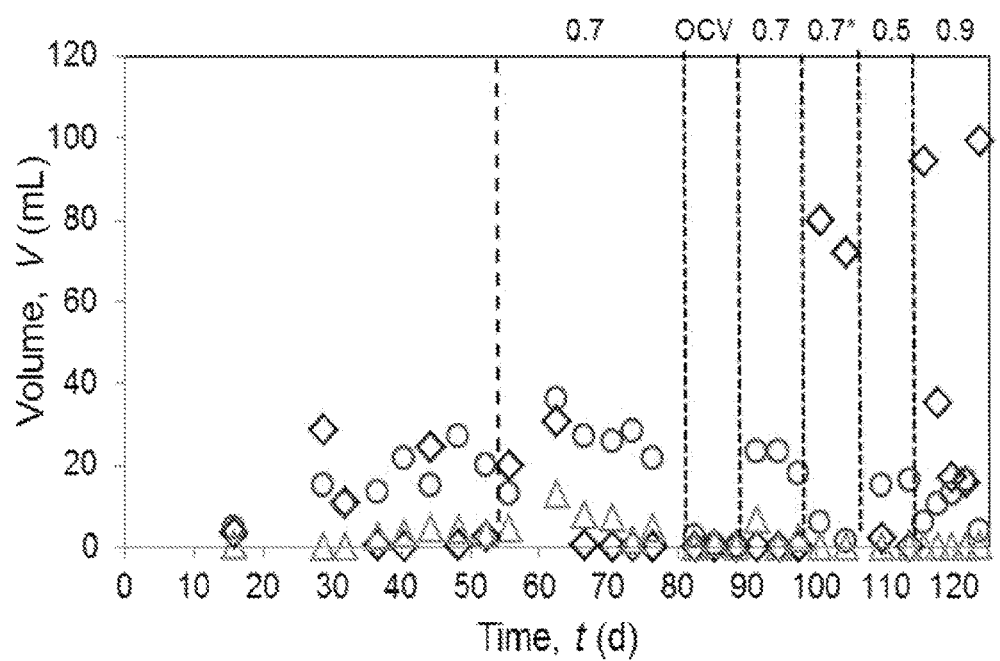
FIG. 5 is a graph depicting biogas production in the anaerobic electrochemical membrane bioreactor: hydrogen (blue diamonds) and methane (red circles).

FIG. 5 shows biogas production in the anaerobic electrochemical membrane bioreactor: hydrogen (blue diamonds) and methane (red circles). The dashed vertical line indicates the point at which graphene-coated Ni-HFM were replaced with uncoated Ni-HFM. It shows that hydrogen was the dominant gas produced in the first two cycles with both graphene coated and uncoated Ni-HFMs.

Figure 6:
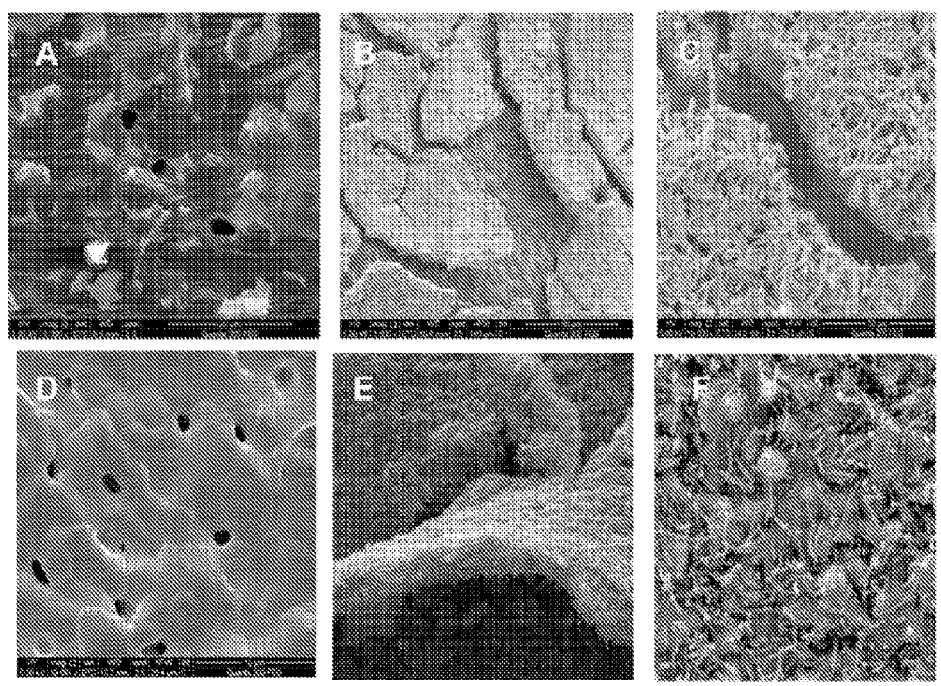
FIG. 6 is a series of SEM images of graphene coated (A=virgin, B and C=biofouled) and uncoated (D=virgin, E and F=biofouled) Ni-HFMs.

Over time methane became dominant and the hydrogen fraction was negligible. This suggests that bacteria capable of converting hydrogen to methane, known as hydrogenotrophic methanogens, were able to colonize the Ni-HFMs cathode filters and convert the hydrogen being evolved at the surface of the electrode to methane. Scanning electron micrographs (SEM) (FIG. 6) clearly show the presence of a biofilm (composed of both bacteria and archaea) coating the cathode filters of both the graphene coated and uncoated Ni-HFMs.

Figure 7:
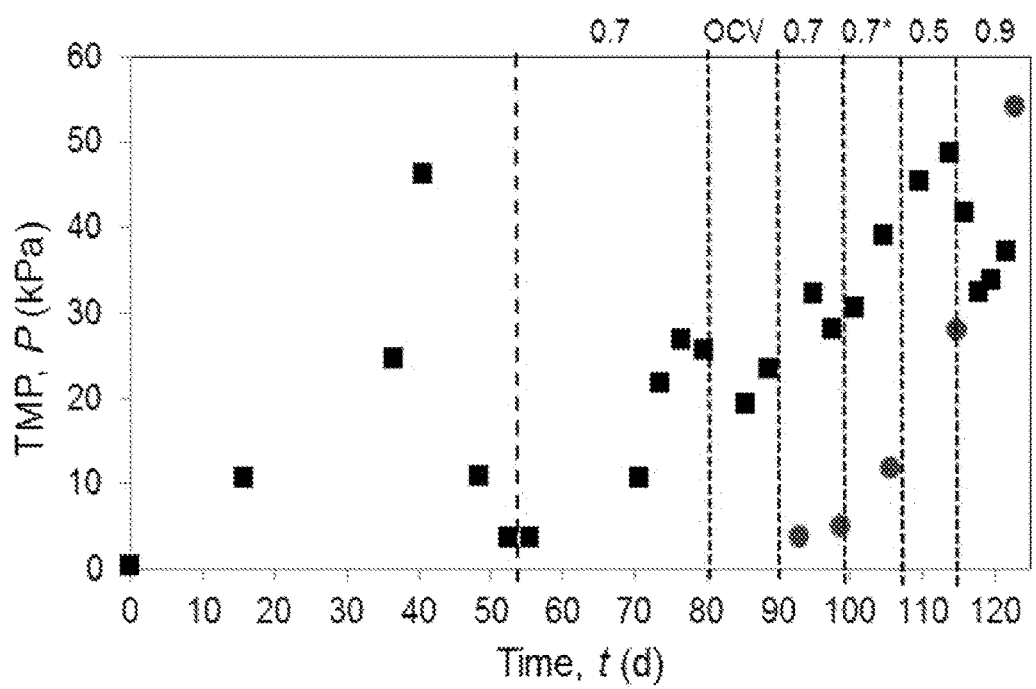
FIG. 7 is a graph depicting transmembrane pressure measured at the end of each batch cycle (average values) for the experimental reactor (black squares) and control reactor (red circles).

The transmembrane pressure increased over the course of the experiment demonstrating an increase in resistance to permeate flux (FIG. 7). This increased resistance can be attributed to the build-up of the biofilm observed on the cathode filters in a process known as biofouling. The transmembrane pressure decreased after the applied voltage was increased to 0.9 V. At this applied voltage the hydrogen production rates increased significantly (FIG. 3). This observation suggests that the evolution of hydrogen at the cathode surface may provide a mechanism to detach some of the biofilm layer thus reducing resistance to the passage of treated effluent across the membrane. The TMP of the control reactor increased more rapidly than that of the experimental reactor (FIG. 5).

Figure 8:
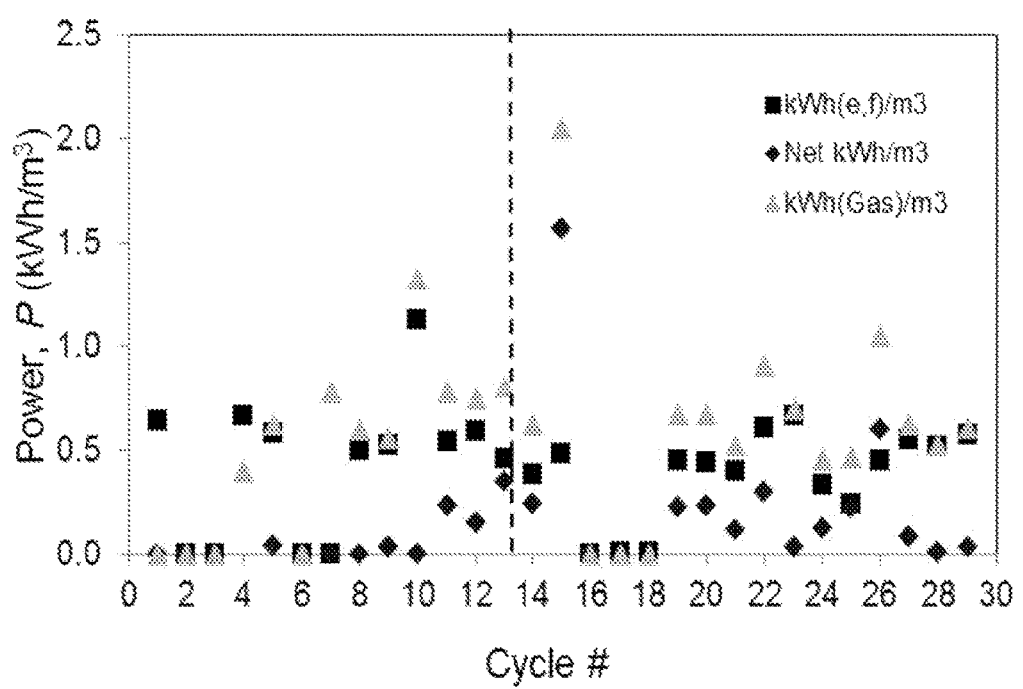
FIG. 8 is a graph depicting energy recovery of an anaerobic electrochemical membrane bioreactor (AnEMBR) over the course of the experiment.

The energy recovery of the AnEMBR can be evaluated based on the energy consumed due to pumping and electrical power input and the energy content of the biogas produced. FIG. 8 shows that the AnEMBR produced more energy, in the form of biogas, than it consumed for pumping and electrical input over the course of the experiment. In FIG. 8, kWh(e,f) represents the energy consumption due to electrical energy input and pumping for filtration and kWh (Gas) represents the energy content of the recovered biogas (made up of hydrogen and methane).

The amount of energy added to the system by the power source, adjusted for losses across the resistor ($W_E$) is given by equation 1 in Call, D., Logan, B. E. 2008. Hydrogen production in a single chamber microbial electrolysis cell (MEC) lacking a membrane. *Environmental Science & Technology*, 42(9), 3401-3406, which is incorporated by reference in its entirety.

$$W_E \text{ (kJ)} = \sum_{1}^{n} (IE_{ap}\Delta t - I^2 R_{ex}\Delta t) \quad (1)$$

where Eap (V) is the voltage applied using the power source, $\Delta t$ (s) is the time increment for n data points measured during a batch cycle, and $R_{ex}=10\Omega$ is the external resistor in the circuit. $W_E$ is then converted to kWh using a conversion factor of 0.000278 and normalizing this power consumption by volume ($m^3$). The energy required for pumping is given by equation 2 (J. Kim, K. Kim, H. Ye, E. Lee, C. Shin, P. L. McCarty and J. Bae, Environmental Science & Technology, 2011, 45, 576-581, which is incorporated by reference in its entirety):

$$P \text{ (kW)} = \frac{Q_1 \gamma E_1}{1000} + \frac{Q_2 \gamma E_2}{1000} \quad (2)$$

where P is the power requirement (kW), $Q_1$ equals the reactor recycle rate of 0.02 L/min (3.33×10$^{-7}$ m$^3$/s), $\gamma$ is 9800 N/m$^3$, and $E_1$ is the measured hydraulic pressure head loss through the system of 0.05 m, $Q_2$ is the permeate flow rate of 0.0096 L/h (2.67×10$^{-9}$ m$^3$/s) and $E_2$ is the head loss due to TMP (m). Dividing the overall power requirement (kW) by the permeate flow rate (9.6×10$^{-6}$ m$^3$/h) yields the pumping energy requirement of the system in kWh/m$^3$.

The energy content of the biogas produced is given by equation 3:

$$W_{Gas}(kJ) = n_{H2}\Delta H_{H2} + n_{CH4}\Delta H_{CH4} \quad (3)$$

Where $n_{H2}$ is the number of moles of hydrogen produced, $\Delta H_{H2}=285.83$ kJ/mol is the energy content of hydrogen based on the heat of combustion (upper heating value), $n_{CH4}$ is the number of moles of methane produced and $\Delta H_{CH4}=891$ kJ/mol is the energy content of methane. $W_{Gas}$ is then converted to kWh using a conversion factor of 0.000278 and normalizing this power consumption by volume ($m^3$).

Example 2

In another example, The reactor (350 mL) was fed *Geobacter* growth medium (see, K. Katuri, P. Kavanagh, S. Rengaraj and D. Leech, Chemical Communications, 2010, 46, 4758-4760, which is incorporated by reference in its entirety), inoculated with anaerobic digester effluent (10% v/v), and acclimated at an applied voltage of 0.7 V under batch operation for two months prior to obtaining experimental results. At the end of each experimental batch cycle the treated medium was filtered through the cathode filters using a peristaltic pump. The transmembrane pressure (TMP) of the filters was measured by means of a pressure transducer (68075-32, Cole-Parmer Instrument Company) connected to a computer. Biogas was collected in a gas bag connected to the top of the reactor. At the end of each batch cycle, the gas composition in the reactor headspace and gas bag was analysed by gas chromatography and acetate was measured using HPLC (Accela LC Systems, Thermo Scientific).

Figure 9:
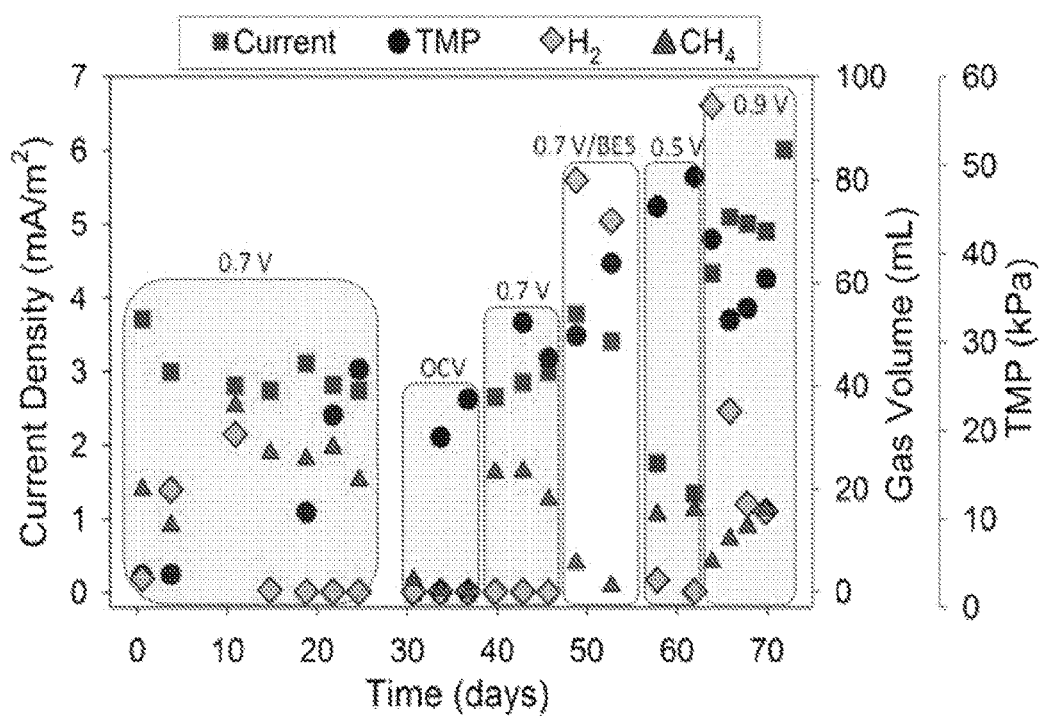
FIG. 9 is a graph depicting current density, gas production and transmembrane pressure (TMP) of the AnEMBR measured over the course of the experiment.

At an applied voltage of 0.7 V the AnEMBR produced 11.1±0.8 A/$m^3$ or 2.7±0.2 A/$m^2$ based on cathode surface area (4.1 $m^2/m^3$) (FIG. 9) with an average coulombic efficiency (CE) of 81% (Table 1). The system produced a biogas composed predominantly of hydrogen (53%) when virgin Ni-HFMs were first placed into the system (day 0, cycle 1) at a rate of 0.025 $m^3H_2/m^3/d$ (Table 1). The biogas composition shifted to 82.8±7.8% methane gas for the following batch cycles with hydrogen gas concentrations contributing <1% of the total gas composition (FIG. 9).

TABLE 1

Performance measurements of the AnEMBR at different applied voltages.

| Eap (V) | CE | $H_2$ rate ($m^3/m^3/d$) | $CH_4$ rate ($m^3/m^3/d$) | Gas rate ($m^3/m^3/d$) | rCat % ($H_2$) | rCat % ($CH_4$) | Net energy (kWh/$m^3$) |
|---|---|---|---|---|---|---|---|
| 0.5 | 53 | 0.00 | 0.01 | 0.01 | 1.1 | 72.2 | 0.14 |
| 0.7 | 81 | 0.00 | 0.03 | 0.03 | 0.1 | 86.5 | 0.23 |
| 0.9[a] | 57 | 0.20 | 0.01 | 0.21 | 115.9 | 29.1 | 0.72 |
| 0.9[b] | 65 | 0.05 | 0.03 | 0.08 | 22.3 | 50.1 | 0.01 |

Figure 11:
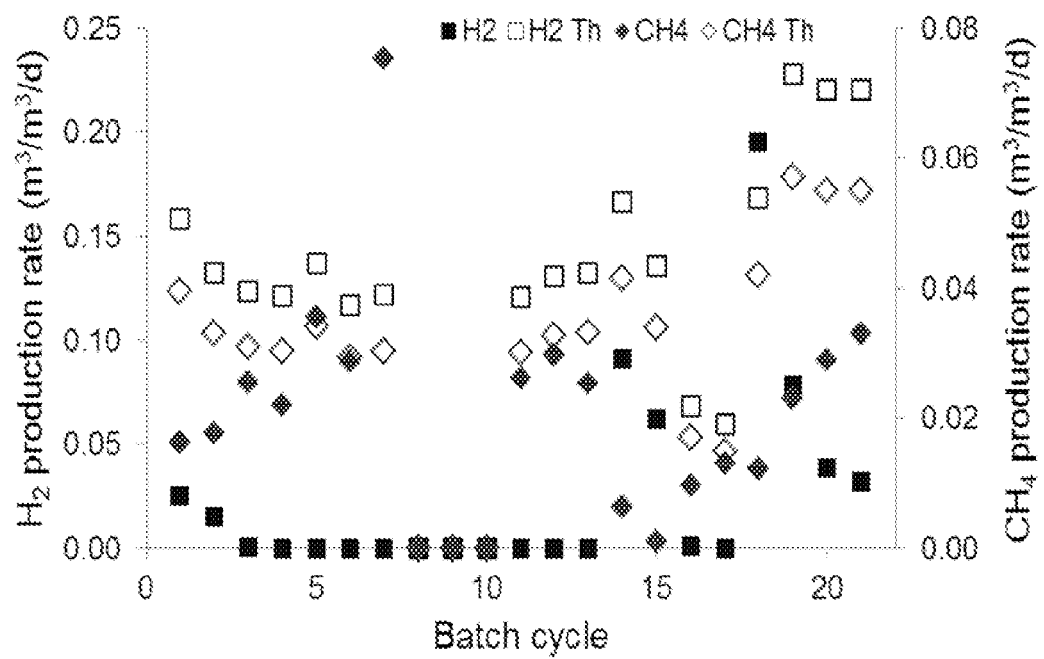
FIG. 11 is a graph depicting Theoretical hydrogen and methane production rates based on measured current compared with actual measured hydrogen and methane gas production rates.
Figure 12:
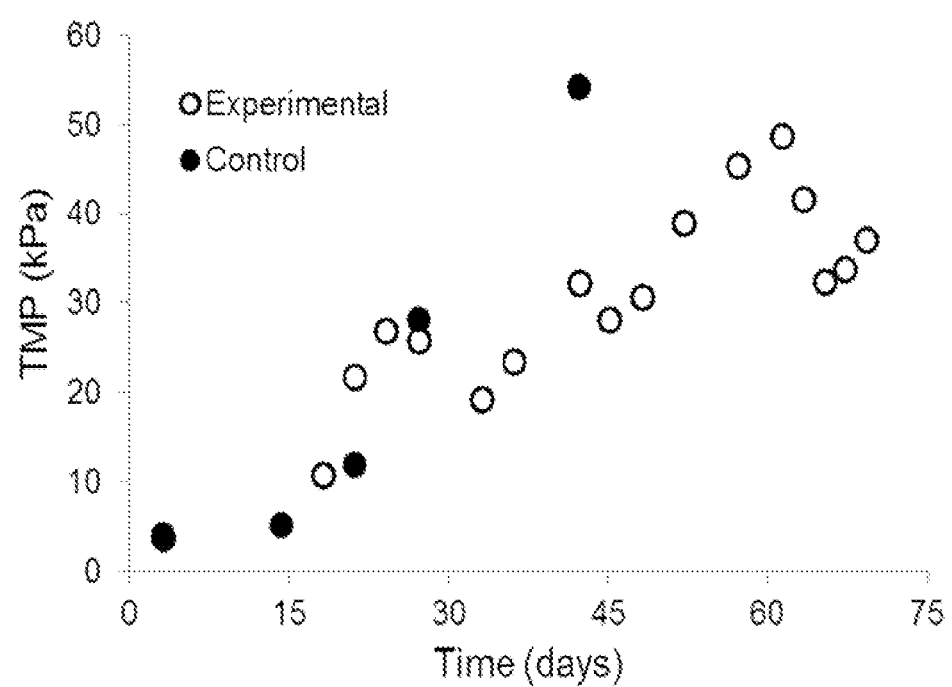
FIG. 12 is a graph depicting Transmembrane pressure (TMP) measurements of the control and experimental reactors.

[a]First cycle of operation at 0.9 V
[b]Average of final three cycles of operation at 0.9 V Overall biogas production during this time averaged 0.028±0.006 $m^3/m^3/d$ at the applied voltage of 0.7 V (Table 1). The hydrogen produced at the cathode fibers was converted to methane via hydrogenotrophic methanogenesis. This was confirmed by the absence of methane gas when the system was operated in open circuit mode for three cycles (FIG. 9, days 30-38). The measured methane production did not exceed the maximum that could be achieved based on the conversion of 8 mol of electrons and by stoichiometric conversion of current into methane (8 mol of electrons per mol of methane), providing additional justification for the mechanism of methane production (FIG. 11). The methane fraction of the biogas was appreciably higher than typical percentages for biogas from conventional anaerobic digestion processes (60-75%), in which acetoclastic methanogenesis is the dominant methane production pathway. Acetoclastic methanogenesis produces equal amounts of methane and $CO_2$, yielding a biogas with a large proportion of $CO_2$. See, G. F. Parkin and W. F. Owen, Journal of Environmental Engineering, 1986, 112, 867-920, which is incorporated by reference in its entirety. The relative purity of the biogas produced in the AnEMBR is an additional advantage to producing biogas bioelectrochemically.

The conversion of hydrogen gas to methane is well documented in MEC systems and can dominate when the hydraulic retention time is long or if continuous flow operation is used. See, D. Call and B. E. Logan, *Environmental Science & Technology*, 2008, 42, 3401-3406, R. D. Cusick, B. Bryan, D. S. Parker, M. D. Merrill, M. Mehanna, P. D. Kiely, G. Liu and B. E. Logan, *Applied Microbiology and Biotechnology*, 2011, 89, 2053-2063, P. Clauwaert and W. Verstraete, *Applied Microbiology and Biotechnology*, 2009, 82, 829-836, and G. K. Rader and B. E. Logan, *International Journal of Hydrogen Energy*, 2010, 35, 8848-8854, each of which is incorporated by reference in its entirety. The measured methane gas represented a cathodic methane recovery (rCat) of more than 80% (Table 1). This means that it was possible to recover a large fraction of the theoretical maximum number moles of methane possible based on the measured current.

Figure 15:
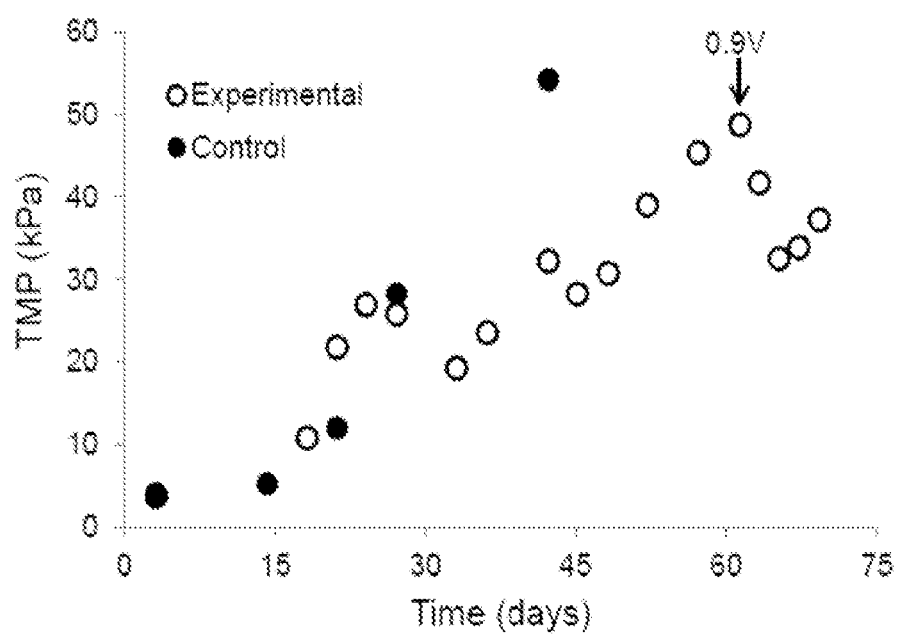
FIG. 15 is a graph depicting transmembrane pressure (TMP) measurements of the control (open circuit voltage) and experimental reactors.
Figure 16:
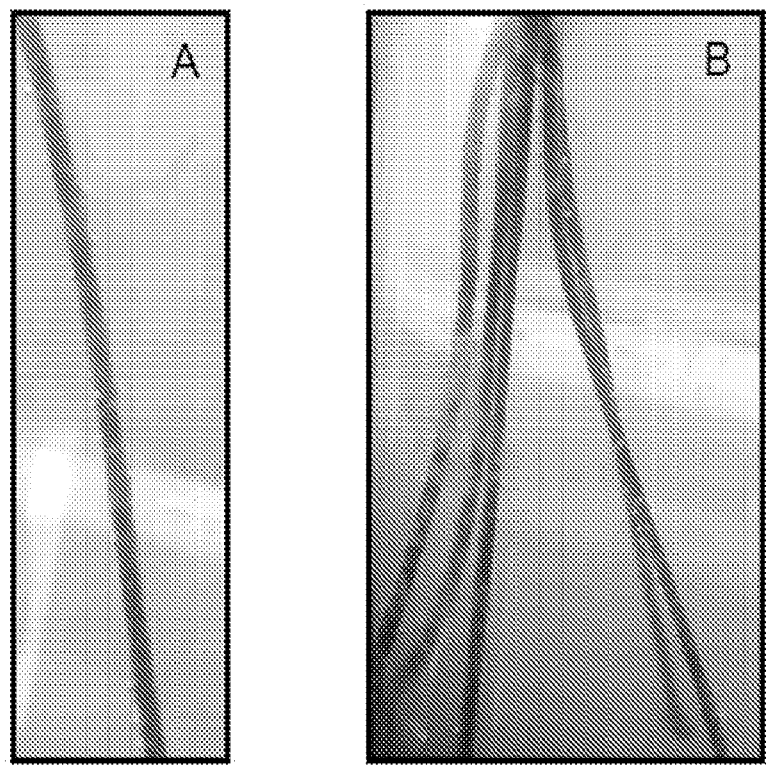
FIG. 16 is photographs of nickel hollow-fiber membrane cathodes showing gas bubble formation at the electrode surface of a single fibre (A) and the bundle of fibres (B) while the reactor was in operation.
Figure 17:
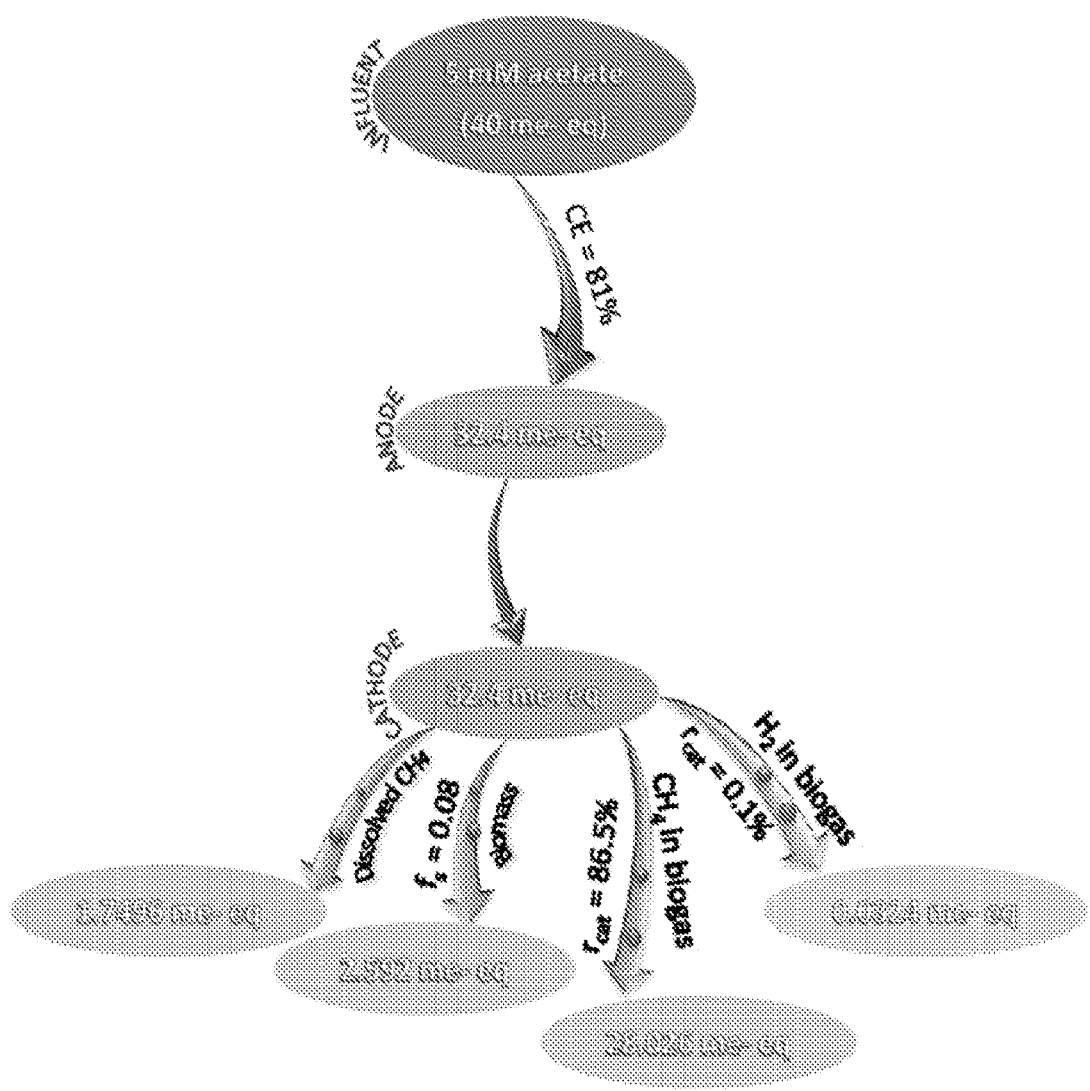
FIG. 17 is a schematic of estimation of the percentage of dissolved methane based on fs of 0.08 for hydrogenotrophic methanogens and using the values of CE and $r_{cat}$ from Table 1 (applied voltage of 0.7V). The total methane that could be generated at the cathode by hydrogenotrophic methanogens was estimated to be 29.77 me⁻ eq.

The AnEMBR had been in operation for nearly two months prior to inserting fresh Ni-HFMs. This extended acclimation period likely provided a suitable amount of time for hydrogenotrophic methanogens to establish a sufficiently high abundance within the reactor and provides an explanation for the rapid onset of methane production. Quantitative PCR (qPCR) analysis revealed that the ratio of archaea to bacteria increased significantly (0.06 to 0.47) from day 24 to day 69 (FIG. 15). This shows that archaea, predominantly the hydrogenotrophic methanogens Methanobacteriales, played a dominant role in the biofouling phenomenon over the extended period of operation. The localised $H_2$ availability and high pH at the cathode surface seemed to favour the growth of Methanobacteriales. Some species of Methanobacteriales are known to be alkaliphilic, thriving at pH values between 8.1 to 9.1. See, J.-L. Garcia, B. K. Patel and B. Ollivier, *Anaerobe*, 2000, 6, 205-226, which is incorporated by reference in its entirety.

The addition of 50 mM 2-bromoethansulfonate (BES) inhibited the conversion of hydrogen to methane resulting in significantly higher yields of hydrogen gas as well as an increase in CE to 80% (FIG. 9, days 49-53). BES is a known inhibitor of methanogenesis and the addition of this compound was used to assess the maximum achievable hydrogen production of the system at 0.7 V. The measured hydrogen gas represented a cathodic hydrogen recovery of 55% in the presence of 50 mM BES and was produced at a considerably higher rate (0.091 $m^3H_2/m^3/d$). Methane gas was still present in the produced biogas but at much lower concentrations (7%) which shows that methanogens were not completely inhibited and some hydrogen was converted to methane (FIG. 9).

By reducing the applied voltage to 0.5 V, both the current and biogas production decreased (FIG. 9, days 58-62). The rate of gas production was reduced by more than half to 0.012±0.001 $m^3/m^3/d$ containing 93±6% methane (FIG. 9). Although the CE declined to 53%, a cathodic methane recovery of 88% was achieved (Table 1).

Hydrogen production rates and recoveries can be enhanced in microbial electrolysis cells by increasing the applied voltage. By applying 0.9 V to the AnEMBR, the current density increased to 15 A/$m^3$ (3.7 A/$m^2$) in the first cycle of operation and the maximum rate of hydrogen production increased to 0.20 m³H₂/m³/d (FIG. 9 and Table 1). These production rates and recoveries of hydrogen were not sustained though and the methane content of the biogas increased over subsequent cycles (FIG. 9).

Figure 10:
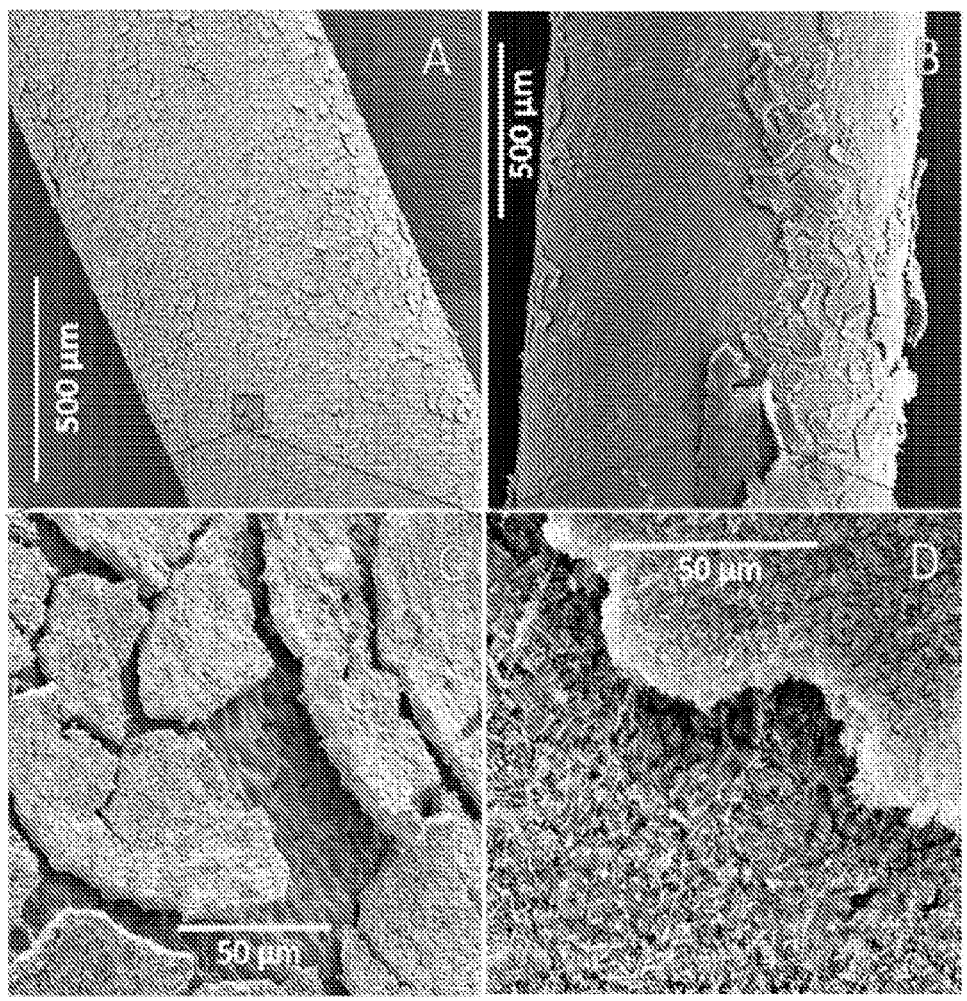
FIG. 10 is scanning electron micrographs of the Ni-HFMs after operation at an applied voltage of 0.7 V (A and C) and 0.9 V (B and D).

Transmembrane pressure increased from 3.8 to 48.7 kPa over two months of operation. TMP can be used as an indicator of membrane fouling and represents an additional resistance to the transport of water across the membrane that needs to be overcome in order to sustain a particular flux. An appreciable drop in TMP was observed following increased rates of hydrogen production when the AnEMBR was operated with an applied voltage of 0.9 V (FIG. 9). Scanning electron microscopy showed a noticeable difference in the biofilm coverage for Ni-HFMs operated at 0.5 V and following operation at 0.9 V (FIG. 10). This observation suggests that hydrogen bubble formation at the electrode surface could provide a means of scouring the surface of the membrane. The mechanism is hypothesized as rupturing of the biofouling layer once the bubbles are liberated from the membrane surface, which causes sloughing off of the layer. In addition, the imposed lower electrode potential and alkaline pH at the cathode-membrane surface due to HER disfavours bacterial cell adhesion and growth, providing additional measures to mitigate biofouling in this hybrid configuration.

It is possible to achieve a positive energy balance in a microbial electrolysis cell even if all the H₂ evolved is converted to methane. See, R. D. Cusick, B. Bryan, D. S. Parker, M. D. Merrill, M. Mehanna, P. D. Kiely, G. Liu and B. E. Logan, *Applied Microbiology and Biotechnology*, 2011, 89, 2053-2063, which is incorporated by reference in its entirety. The energy content of the biogas produced by the AnEMBR exceeded the energy input to the system to drive H₂ evolution as well as to filter the treated water (Table 1). Using the higher heating values for H₂ (286 kJ/mol) and methane (891 kJ/mol), the AnEMBR produced 0.23±0.08 kWh/m³ at an applied voltage of 0.7 V and a current density of 11.1±0.8 A/m³ (ηE) (Table 2). A positive energy balance was maintained at applied voltages of 0.5 V (0.16 kWh/m3) and 0.9 V (0.03 kWh/m3). A significant fraction of the substrate was recovered in the in the form of biogas (71% at 0.7 V) (Table 2) and compares favourably with other anaerobic MBR technologies that report recovery of 83% of the substrate. See, J. Kim, K. Kim, H. Ye, E. Lee, C. Shin, P. L. McCarty and J. Bae, Environmental Science & Technology, 2011, 45, 576-581, which is incorporated by reference in its entirety.

TABLE 2

Efficiencies and overall energy recoveries of the AnEMBR at different applied voltages.

| $E_{ap}$ | $\eta_E$ (%)[a] | $\eta_S$ (%)[b] | Electricity (power supply + pumping) (kWh/m³)[c] | Energy recovery (kWh/m³)[d] | Net energy (kWh/m³) |
|---|---|---|---|---|---|
| 0.5 | 158 | 39 | 0.30 | 0.46 | 0.16 |
| 0.7 | 146 | 71 | 0.51 | 0.74 | 0.24 |
| 0.9 | 105 | 53 | 0.46 | 0.58 | 0.03 |

[a]Energy efficiency relative to the electrical energy input (power supply and pumping).
[b]Energy efficiency relative to the added substrate.
[c]See Supplementary information for energy consumption calculations.
[d]See Supplementary information for energy recovery calculations.

The AnEMBR offers a novel approach to the anaerobic treatment of wastewaters with low-organic strength. The technology represents a truly integrated system that achieves wastewater treatment, energy recovery and water reuse in a single reactor with net energy production.

The AnEMBR represents a proof-of-concept technology applying electrically conductive, porous hollow fibre membranes in a BES for low-organic strength wastewater treatment and resource recovery (biogas and water). The biogas recovered contains sufficient energy to offset the total electrical energy required for operation creating an energy positive treatment system. Biogas produced bioelectrochemically has low levels of carbon dioxide; an advantage over traditional AD systems. Observations from this study suggest that biofouling could be mitigated by increasing rates of biogas production which can be controlled by regulating the applied voltage. Further studies are necessary to evaluate the relationship between biogas production rate and biofouling. The preliminary results for the AnEMBR indicate that the process could be economically practical considering the fraction of substrate energy than can be recovered (71%) as biogas from such a low strength substrate.

Membrane Cleaning

After 60 days of operation the reactors were disassembled and the cathode HFM removed for cleaning Each set of fibers was placed into a sodium hypochlorite solution (1%) for 15 minutes. The fibers were next immersed into concentrated hydrochloric acid (HCl) for 5-10 seconds, before rinsing briefly in a beaker of deionized water placed in a sonication bath. The fibers were dipped five times in the HCl before being rinsed with distilled water and replaced into the reactor.

Energy Recovery Calculations

The moles (n) of gas produced from the measured gas volume were calculated using equation 4

$$n \text{ (mol)} = \frac{v \text{ (L)}}{T \text{ (K)} R \text{ (L} \cdot \text{atm} \cdot \text{K}^{-1} \text{mol}^{-1})} \quad (4)$$

where v is the volume of gas (L), T is the temperature (298 K) and R is the gas constant (0.08206 L·atm·K⁻¹·mol⁻¹). The energy content of the biogas produced is given by equation 5:

$$W_{Gas}(\text{kJ}) = n_{H2} \Delta H_{H2} + n_{CH4} \Delta H_{CH4} \quad (5)$$

where $n_{H2}$ is the number of moles of hydrogen produced, $\Delta H_{H2}$=285.83 kJ/mol is the energy content of hydrogen based on the heat of combustion (upper heating value), $n_{CH4}$ is the number of moles of methane produced and $\Delta H_{CH4}$=891 kJ/mol is the energy content of methane. $W_{Gas}$ is then converted to kWh using a conversion factor of 0.000278 (1 kWh=3600 kJ) and normalizing this power consumption by volume of the reactor (m³).

The moles of hydrogen and methane that can be recovered based on the measured current, $n_{CE}$, were calculated based on equations 6 and 7 respectively:

$$n_{CE}(\text{H2}) = \frac{\int_{t=0}^{t} I dt}{2F} \quad (6)$$

$$n_{CE}(\text{CH4}) = \frac{\int_{t=0}^{t} I dt}{2F} \quad (7)$$

where I=V/R$_{ex}$ is the current (A) calculated from the voltage across the resistor (10Ω), 2 is used to convert moles of electrons to moles of hydrogen, F=96 485 C/mol e− is Faraday's constant, and dt (s) is the interval (20 min) over which data were collected. The moles of hydrogen and methane actually recovered relative to that possible based on the measured current is the cathodic recovery, $r_{Cat}$, calculated using equations 8 and 9 respectively $$r_{Cat}(H2) = \frac{n_{H2}}{n_{CE}} \quad (8)$$

$$r_{Cat}(CH4) = \frac{n_{CH4}}{n_{CE}} \quad (9)$$

where $n_{H2}$ and $n_{CH4}$ are the number of moles of hydrogen and methane recovered during a batch cycle.

Energy Consumption Calculation

The energy consumed for recirculation and filtration was calculated using the pump power requirement equation (Kim et al., 2011), shown in equation 10

$$P \text{ (kW)} = \frac{Q_1 \gamma E_1}{1000} + \frac{Q_2 \gamma E_2}{1000} \quad (10)$$

where P is the power requirement (kW), $Q_1$ equals the reactor recycle rate of 0.02 L/min ($3.33 \times 10^{-7}$ m$^3$/s), $\gamma$ is 9800 N/m$^3$, and $E_1$ is the measured hydraulic pressure head loss through the system of 0.05 m, $Q_2$ is the permeate flow rate of 0.0096 L/h ($2.67 \times 10^{-9}$ m$^3$/s) and $E_2$ is the head loss due to TMP (m). Dividing the overall power requirement (kW) by the permeate flow rate ($9.6 \times 10^{-6}$ m$^3$/h) yields the pumping energy requirement of the system in kWh/m$^3$.

The amount of energy added to the system by the power source, adjusted for losses across the resistor ($W_E$) is given by equation 11

$$W_E \text{ (kJ)} = \sum_1^n (IE_{ap}\Delta t - I^2 R_{ex} \Delta t) \quad (11)$$

where $E_{ap}$ (V) is the voltage applied using the power source, $\Delta t$ (s) is the time increment for n data points measured during a batch cycle, and $R_{ex} = 10\Omega$ is the external resistor in the circuit. $W_E$ is converted to kWh using a conversion factor of 0.000278 and normalizing this power consumption by volume (m$^3$).

Energy Efficiency Calculations

The energy efficiency relative to the electrical input ($\eta E$) is the ratio of the energy content of the biogas produced to the input electrical energy required, or $$\eta_E = \frac{(n_{H2}\Delta H_{H2}) + (n_{CH4}\Delta H_{CH4})}{W_E} \quad (12)$$

where $\Delta H_{H2}=285.83$ kJ/mol is the energy content of hydrogen based on the heat of combustion (upper heating value) and $W_{H2}=n_{H2}\Delta H_{H2}$, $\Delta H_{CH4}=890$ kJ/mol is the energy content of methane based on the heat of combustion (upper heating value) and $W_{CH4}=n_{CH4}\Delta H_{CH4}$. The efficiency relative to the added substrate ($\eta S$) is given by eq 13

$$\eta_S = \frac{(n_{H2}\Delta H_{H2}) + (n_{CH4}\Delta H_{CH4})}{W_S} \quad (13)$$

where $W_S$ is the amount of energy added by the substrate given by equation 14

$$W_S(kJ) = \Delta H_S \cdot n_S \quad (14)$$

where $\Delta H_S = 870.28$ kJ/mol is the heat of combustion of the substrate (acetate), and $n_S$ is the number of moles of substrate consumed.

The overall energy recovery relative to both electricity and substrate inputs ($\eta_{E+S}$) is given by $$\eta_{E+S} = \frac{W_{Gas}}{W_E + W_S} \quad (15)$$

The energy contributed by the power source ($e_E$) and substrate ($e_S$) were calculated as percentages using $$e_E = \frac{W_E}{W_E + W_S} \quad (16)$$

$$e_S = \frac{W_S}{W_E + W_S} \quad (17)$$

Evaluating Energy Yield

The governing hypothesis for this system is that hydrogen gas is produced via proton reduction at the cathode followed by conversion to methane gas via hydrogenotrophic methanogenesis. The evidence for this is the absence of any hydrogen gas when the system was operated in OCV mode which allows us to discount hydrogen production via acetoclastic methanogenesis.

The stoichiometric equations for the principal reactions taking place in this system are as follows:

CH$_3$COO$^-$+4H$_2$O→2HCO$_3^-$+9H$^+$+8e$^-$(Anodic reaction)    1)

2H$^+$+2e$^-$→H$_2$(Cathodic reaction)    2)

4H$_2$+CO$_2$→CH$_4$+H$_2$O(Hydrogenotrophic methanogenesis)    3)

The analysis of the energy data represented in the manuscript was based on the measured gas volumes and measured current from the system. The theoretical gas production was based on the stoichiometric maximum that could be achieved based on the measured current. The analysis reveals that the measured gas did not exceed the theoretical maximum. Considering the absence of methane gas when the system was operated at OCV, which would reveal acetoclastic methanogenesis, FIG. 11 supports the hypothesis for methane generation via hydrogenotrophic methanogenesis.

Theoretical and Measured as Production Rates

The theoretical gas production was based on the stoichiometric maximum that could be achieved based on the measured current:

$$Q_{max(H2)} = \frac{I_v\left(\frac{A}{m^2}\right) 0.5\left(\text{mol}\frac{H_2}{\text{mol}}\right) 86400\left(\frac{s}{d}\right)}{F\left(9.65 \times 10^4 \frac{C}{\text{mol}}\right) c_g\left(\text{mol}\frac{H_2}{L}\right)\left(\frac{10^3 \text{ L}}{m^2}\right)} \quad (18)$$

-continued $$Q_{max(CH_4)} = \frac{I_v\left(\frac{A}{m^2}\right)0.125\left(mol\frac{CH_4}{mol}\right)86400\left(\frac{s}{d}\right)}{F\left(9.65\times10^4\frac{C}{mol}\right)c_g\left(mol\frac{CH_4}{L}\right)\left(\frac{10^2\,L}{m^2}\right)} \quad (19)$$

where Iv (A/m3) is the volumetric current density over the peak period of current production normalized by the reactor volume and cg is the concentration of gas at a temperature T calculated using the ideal gas law.

Figure 14:
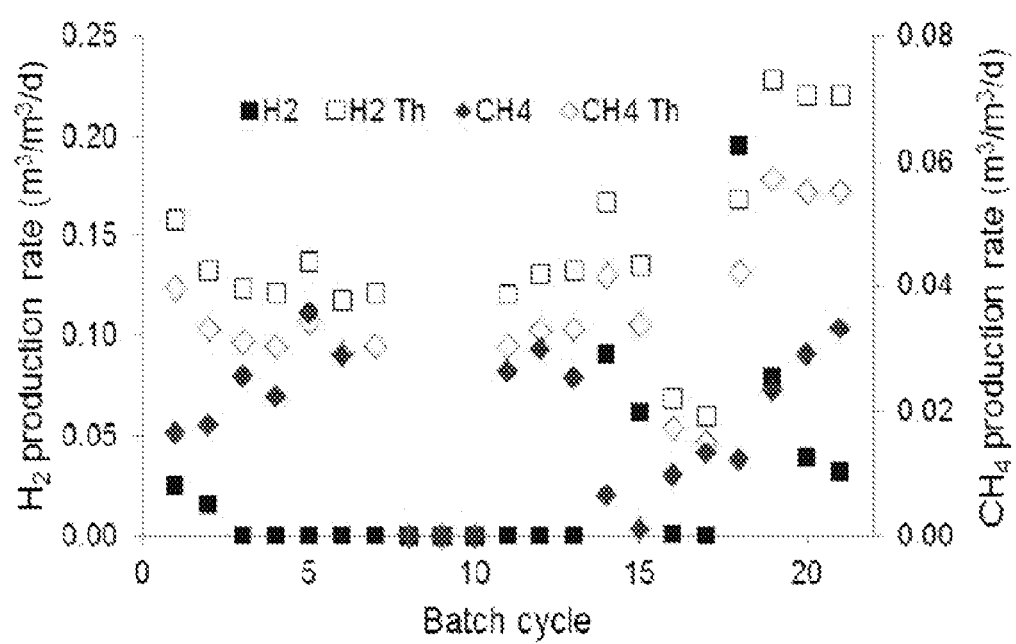
FIG. 14 is a graph depicting theoretical hydrogen and methane production rates based on measured current compared with actual measured hydrogen and methane gas production rates.

The theoretical moles of hydrogen and methane that can be recovered based on the measured current were calculated using equations (6) and (7). The analysis reveals that the measured gas did not exceed the theoretical maximum (FIG. 14). For most of the batch cycles, the measured methane production rate was close to the theoretical value when the hydrogen production rate was minimal (FIG. 14, batch cycles 3-6, 11-13 and 16-17); this further supports that methane generation was mainly due to hydrogenotrophic methanogenesis.

Measurements and Analyses

Total suspended solids (TSS) were measured using standard methods. See, APHA, Standard Methods for the Examination of Water and Wastewater. 20th ed.; American Public Health Association, American Water Works Association, Water Environment Federation: Washington D.C., 1998, which is incorporated by reference in its entirety. Samples for acetate analysis were filtered through 0.45 μm pore diameter syringe filters prior to analysis to remove any particulate matter. Acetate concentrations were measured with an Aminex HPX-87H Ion Exclusion Column (Bio-Rad Laboratories, Hercules, Calif.) using 5 mM sulphuric acid solution as mobile phase at a flow rate of 0.55 mL/min. The HPLC unit was an Accela HPLC system (Thermo Scientific) fitted with a photodiode array (PDA) detector. Peaks were detected at 210 nm. Coulombic efficiency (CE) was calculated as $CE=C_t/C_{th}\times100\%$, where $C_t$ was the total coulombs calculated by integrating the current over time ($C_t=\Sigma I\,\Delta t$, where $\Delta t$ is the duration of a cycle), Cth was the theoretical amount of coulombs available based on the acetate removed over the same amount of time, calculated as $C_{th}=[F\,b\,(C_{in}-C_{out})]/M$, where F is Faraday's constant (96485 C/mol), b=8 is the number of electrons produced per mole of acetate, $C_{in}$ and $C_{out}$ are the influent and effluent acetate concentrations and M=82 is the molecular weight of acetate.

Gas was collected in a gas bag connected to the top of the reactor. At the end of each batch cycle, the gas composition in the reactor headspace and gas bag was analyzed using two gas chromatographs (model 310, SRI Instruments) for $H_2$, $N_2$, $CH_4$ and $CO_2$, according to methods described in Call, D.; Logan, B. E., Hydrogen production in a single chamber microbial electrolysis cell lacking a membrane. Environ. Sci. Technol. 2008, 42, (9), 3401-3406, which is incorporated by reference in its entirety.

Internal resistance ($R_{int}$) of the assembled reactors was measured by electrochemical impedance spectroscopy (EIS) using a potentiostat (VMP3, BioLogic, Claix, France) under open circuit conditions, over a frequency range of 100 kHz to 0.1 Hz with a sinusoidal perturbation of 14.2 mV amplitude (two electrode setup). Internal resistance was determined from Nyquist plots of the impedance spectra where the real impedance Zre intersected the X-axis (imaginary impedance Zim=0). See, He, Z.; Wagner, N.; Minteer, S. D.; Angenent, L. T., The upflow microbial fuel cell with an interior cathode: assessment of the internal resistance by impedance spectroscopy. Environ. Sci. Technol. 2006, 40, (17), 5212-5217, and Logan, B. E.; Cheng, S.; Watson, V.; Estadt, G., Graphite fiber brush anodes for increased power production in air-cathode microbial fuel cells. Environ. Sci. Technol. 2007, 41, (9), 3341-3346, each of which is incorporated by reference in its entirety. EIS tests were carried out at the end of the experiment.

Linear sweep voltammetry (LSV) was used to test the cathode performance of the graphene coated Ni-HFM compared to uncoated Ni-HFM, stainless steel, and graphite electrodes. These tests were performed in a single chamber electrochemical cell using a potentiostat (VMP3, BioLogic, Claix, France) at a scan rate of 1 mV/s over a potential range of 0 V to −1.4 V (vs. Ag/AgCl). The cell was filled with the same medium as that used during the experiment. EIS was also conducted for the previously used tubular reactor to quantify its internal resistance.

The biofilms on the Ni-HFM membranes were examined using scanning electron microscopy (SEM). Prior to SEM imaging, new and biofilm covered membranes were dehydrated in a series of graded alcohol solutions and oven dried (2 h at 30° C.). The samples were mounted either flat onto an aluminum stub using thin aluminum tape or vertically inside a machined slot aluminum stub. After sputter-coating the samples with gold palladium for 30 s at 25 mA current in an argon atmosphere, SEM imaging (Quanta 200D, FEI, The Netherlands) was performed using an accelerating voltage of 25 kV and working distance of 10 mm.

Fabrication of the Nickel Hollow-Fibre Membranes (Ni-HFMs)

Nickel powders, 1-methyl-2-pyrrolidinone (NMP, HPLC grade, 99.5%, Alfa Aesar), Polyether Sulfone (PES, Ultrason® E6020P, BASF) and Polyvinylpyrrolidone (PVP, Alfa Aesar) were mixed and well dispersed by ball milling for 18 h, followed by degassing under vacuum for 24 h. After that, the suspension was extruded through a spinneret using water as the inner and outer coagulant. The black body of the hollow fibre was dried at room temperature and then sintered at 560 C for 6 h to remove organic compounds in air flow of 500 mL/min. After cooling to room temperature, the fibre was reduced from the metal oxide state to the metal state at 810° C. for 6 h in pure hydrogen of 500 mL min$^{-1}$.

Acetate Analysis (HPLC)

Samples were filtered through 0.45 μm syringe filters prior to analysis to remove any particulate matter. Acetate concentrations were measured with an Aminex HPX-87H Ion Exclusion Column (Bio-Rad Laboratories, Hercules, Calif.) using 5 mM sulphuric acid solution as mobile phase at a flow rate of 0.55 mL/min. The HPLC unit was an Accela HPLC system (Thermo Scientific) fitted with a photodiode array (PDA) detector. Peaks were detected at 210 nm.

qPCR Analysis

DNA Extraction and qPCR Analysis

Biomass samples were collected from the fouled Ni-HFMs using a sterile scalpel blade at different time intervals, and suspended in 0.5 ml sterile buffer. The samples were stored at −80° C., until analysed. DNA was extracted from aliquots (250 μl) of previously frozen samples using the PowerSoil™ DNA extraction kit (MO BIO Laboratories Inc., USA) as per the manufacturer's instructions, and quantified using a NanoDrop spectrophotometer (Thermo Scientific).

To quantify the abundance of total bacteria, total archaea and various methanogenic orders (Methanobacteriales, Methanomicrobiales and Methanosarcinales) quantitative PCR (qPCR) was performed in a 25-μL reaction volume containing 12.5 μL of 2×iQ Supermix (Bio-Rad Laboratories, Hercules, Calif.), 0.5 μM of each primer, 0.2 μM of each probe, 1 μl sample DNA, and RNase-free sterile water to a final volume of 25 μL. Amplification was performed using the CFX96 real-time PCR detection system (Bio-Rad Laboratories, Hercules, Calif.) with PCR conditions described by Ritalahti, K. M., Amos, B. K., Sung, Y., Wu, Q., Koenigsberg, S. S., Löffler, F. E. 2006. Quantitative PCR targeting 16S rRNA and reductive dehalogenase genes simultaneously monitors multiple Dehalococcoides strains. *Applied and Environmental Microbiology,* 72(4), 2765-2774, and Yu, Y., Lee, C., Kim, J., Hwang, S. 2005. Group-specific primer and probe sets to detect methanogenic communities using quantitative real-time polymerase chain reaction. *Biotechnology and Bioengineering,* 89(6), 670-679, each of which is incorporated by reference in its entirety. All primers, probes and plasmid standards used in the examples are listed in Table 3. For each qPCR run, a negative (no template) control was used to test for false positives or contamination. The genomic DNA from each sample was amplified in triplicate.

Additional Experiments with Duplicate AnEMBR to Determine Level of Reproducibility in Performance Additional experiments with duplicate AnEMBR were conducted at an applied voltage of 0.7 V to determine the level of reproducibility in performance and linking this reproducibility to the community composition on the anode. The performance of the reactors was highly reproducible as shown in Table 4. In addition, analysis of the anode bacterial community based on qPCR of 16S rRNA gene fragments showed the dominance of Geabacter (93.17%±2.72%) in both reactors, demonstrating the evolution of the same communities in these duplicate reactors.

TABLE 4

Performance of the duplicate AnEMBR at an applied voltage of 0.7

| Eps = 0.7 V | Current density (A/m$^3$) | CE (%) | COD removal (%) |
|---|---|---|---|
| AnEMBR 1[a] | 28.4 ± 2.5 | 74.5 ± 4.0 | 91.6 ± 3.4 |
| AnEMBR 2[a] | 29.6 ± 3.4 | 80.4 ± 4.8 | 87.7 ± 3.1 |

[a]Values represent average of reproducible cycles of operation

TABLE 3

Primers, probes and plasmid standards used in the examples

| Primer-probe | Target | Plasmid standard | Sequence 5'-3' | References |
|---|---|---|---|---|
| BAC 1055 F<br>BAC 1392 R<br>BAC 1115 probe | Total bacteria | *Geobacter sulfurreducens* (NC002939) | ATGGYTGTCGTCAGCT<br>ACGGGCGGTGTGTAC<br>CAACGAGCGCAACCC | Ritalahti et al., 2006* |
| GBC 561 F<br>GBC 825 R | Geobacteraceae | *Geobacter sulfurreducens* (NC002939) | GCGTGTAGGCGGTTTCTTAA<br>TACCCGCRACACCTAGTTCT | Cummings et al., 2003* |
| ARC 787 F<br>ARC 1059 R<br>ARC 915 F probe | Total archaea | *Methanosarcina thermophila* (M59140) | ATTAGATACCCSBGTAGTCC<br>GCCATGCACCWCCTCT<br>AGGAATTGGCGGGGGAGCAC | Yu et al., 2005* |
| MBT 857 F<br>MBT 1196 R<br>MBT 929 probe | *Methanobacteriales* (hydrogenotrophic) | *Methanobacterium formicium* (EU 544028) | CGWAG GGAAG CTGTT AAGT<br>TACCG TCGTC CACTC CTT<br>AGCAC CACAA CGCGT GGA | Yu et al., 2005* |
| MMB 282 F<br>MMB 832 R<br>MMB 749 probe | *Methanomicrobiales* (hydrogenotrophic) | *Methanomicrobiales* KB 1-1 (AN-DQ301905) | ATCGR TACGG GTTGT GGG<br>CACCT AACGC RCATH GTTTA C<br>TYCGA CAGTG AGGRA CGAAA GCTG | Yu et al., 2005* |
| MSC 380 F<br>MSC 828 R<br>MSC 492 probe | *Methanosarcinaceae* (acetoclastic) | *Methanosarcina thermophila* (M59140) | GAAAC CGYGA TAAGG GGA<br>TAGCG ARCAT CGTTT ACG<br>TTAGC AAGGG CCGGG CAA | Yu et al., 2005* |
| MST 702 F<br>MST 863 R<br>MST 753 probe | *Methanosaetaceae* (acetoclastic) | *Methanosaeta* KB 1-1 (AY 570685) | TAATC CTYGA RGGAC CACCA<br>CCTAC GGCAC CRACM AC<br>ACGGC AAGGG ACGAA AGCTA GG | Yu et al., 2005* |

*See Ritalahti, K. M.; Amos, B. K.; Sung, Y.; Wu, Q.; Koenigsberg, S. S.; Löffler, F. E., Quantitative PCR targeting 16S rRNA and reductive dehalogenase genes simultaneously monitors multiple Dehalococcoides strains. Appl. Environ. Microbiol. 2006, 72, (4), 2765-2774, Cummings, D. E.; Snoeyenbos-West, O. L.; Newby, D. T.; Niggemyer, A. M.; Lovley, D. R.; Achenbach, L. A.; Rosenzweig, R. F., Diversity of geobacteraceae species inhabiting metal-polluted freshwater lake sediments ascertained by 16S rDNA analyses. Microb. Ecol. 2003, 46, (2), 257-269, and Yu, Y.; Lee, C.; Kim, J.; Hwang, S., Group-specific primer and probe sets to detect methanogenic communities using quantitative real-time polymerase chain reaction. Biotechnol. Bioeng. 2005, 89, (6), 670-679, each of which is incorporated by reference in its entirety.

Comparison of Hydrogen Production Rates

TABLE 5

Comparison of hydrogen production rates (Q) of various MEC configurations

| Eps (V) | Q ($m^3/m^3d$) | Configuration | Cathode material | Reactor volume (L) | Specific surface area ($m^2/m^3$) | Reference |
|---|---|---|---|---|---|---|
| 0.7 | 0.09[a] | Single chamber | Ni-HFM | 0.35 | 4.1 | This disclosure |
| 0.5 | 0.02 | Double chamber with CEM[b] | Pt catalyzed titanium mesh | 6.6 | 6.1 | Rozendal et al. 2006* |
| 1 | 0.3 | Single chamber with MEA[c] | MEA with Pt catalyst | 3.3 | 12.1 | Rozendal et al. 2007* |
| 0.9 | 1.5 | Single chamber | Stainless steel | 0.03 | 25 | Selembo et al. 2009* |
| 0.9 | 0.79 | Single chamber | Ni | 0.03 | 25 | Selembo et al. 2009* |
| 0.4 | 1.02 | Single chamber | Pt catalyzed carbon cloth | 0.03 | 25 | Call & Logan et al. 2009* |
| 0.8 | 3.12 | Single chamber | Pt catalyzed carbon cloth | 0.03 | 25 | Call & Logan et al. 2009* |
| 1 | 5.6 | Double chamber with AEM[d] | Pt catalyzed titanium mesh | 0.56 | 44.6 | Sleutels et al. 2009* |
| 0.6 | 1.3 | Single chamber | Ni powder | 0.03 | 25 | Selembo et al. 2010* |

[a]Operation with 2-Bromoethanesulfonate, a known inhibitor of methanogenesis.
[b]Cation exchange membrane, CEM.
[c]Membrane-electrode assembly, MEA.
[d]Anion exchange membrane (AEM).
*See, Rozendal, R. A.; Hamelers, H. V. M.; Euverink, G. J. W.; Metz, S. J.; Buisman, C. J. N., Principle and perspectives of hydrogen production through biocatalyzed electrolysis. Int. J. Hydrogen Energy 2006, 31, (12), 1632-1640, Rozendal, R.; Hamelers, H. V. M.; Molenkamp, R. J.; Buisman, C. J. N., Performance of single chamber biocatalyzed electrolysis with different types of ion exchange membranes. Water Res. 2007, 41, 1984-1994, Selembo, P. A.; Merrill, M. D.; Logan, B. E., The use of stainless steel and nickel alloys as low-cost cathodes in microbial electrolysis cells. J. Power Sources 2009, 190, (2), 271-278, Call, D.; Logan, B. E., Hydrogen production in a single chamber microbial electrolysis cell lacking a membrane. Environ. Sci. Technol. 2008, 42, (9), 3401-3406, Sleutels, T. H. J. A.; Lodder, R.; Hamelers, H. V. M.; Buisman, C. J. N., Improved performance of porous bio-anodes in microbial electrolysis cells by enhancing mass and charge transport. International Journal of Hydrogen Energy 2009, 34, (24), 9655-9661, and Selembo, P. A.; Merrill, M. D.; Logan, B. E., Hydrogen production with nickel powder cathode catalysts in microbial electrolysis cells. Int. J. Hydrogen Energy 2010, 35, (2), 428-437, each of which is incorporated by reference in its entirety.

Cost of Materials to Fabricate Conductive Porous Ni-HFM

TABLE 6

Cost of materials to fabricate nickel hollow fiber cathode membranes compared to a platinum catalyzed cathode both having a surface area of 14 $cm^2$

| | Platinum catalyzed cathode | | | Nickel hollow fiber membrane cathode | | |
|---|---|---|---|---|---|---|
| Material | Supplier and part number | Price | Cost (14 $cm^2$) | Material | Supplier and part number | Price | Cost (14 $cm^2$) |
| Pt catalyst (0.5 mg-Pt/$cm^2$) | Fuel Cell Earth, 10% Pt on Vulcan XC 72 PTC10-1 | $55/g | $3.91 | Nickel powder (0.05 g/$cm^2$) | VWR, AA10255-A3 | $0.16/g | $0.11 |
| Carbon cloth (14 $cm^2$) | Fuel Cell Earth, CC4WP2005 | $0.13/$cm^2$ | $1.82 | | | | |
| Carbon black (1.56 mg/$cm^2$) | Fuel Cell Earth, CV-XC72 | $1/g | $0.02 | | | | |
| Nafion (7 μL/mg | Sigma Aldrich, | $3.29/mL | $1.64 | | | | |

TABLE 6-continued

Cost of materials to fabricate nickel hollow fiber cathode membranes compared to a platinum catalyzed cathode both having a surface area of 14 cm²

| | Platinum catalyzed cathode | | | Nickel hollow fiber membrane cathode | | |
|---|---|---|---|---|---|---|
| Material | Supplier and part number | Price | Cost (14 cm²) | Material | Supplier and part number | Price | Cost (14 cm²) |
| Pt—C (catalyst) | 274704-25ML | | | | | | |
| Total cost | | | $7.39 | Total cost | | | $0.11 |

Breakdown of Electrical Energy

TABLE 7

Breakdown of the electrical energy required for the power supply, pumping for recirculation and filtration

| Applied voltage (V) | Power supply (kWh/m³) | Recirculation (kWh/m³) | Filtration (kWh/m³) | Total (kWh/m³) |
|---|---|---|---|---|
| 0.5 | 0.271 (90%) | 0.017 (6%) | 0.013 (4%) | 0.301 |
| 0.7 | 0.489 (96%) | 0.017 (3%) | 0.005 (1%) | 0.511 |
| 0.9 | 0.537 (95%) | 0.017 (3%) | 0.010 (2%) | 0.564 |

Electrochemical Analysis of the Cathodes

Figure 19:
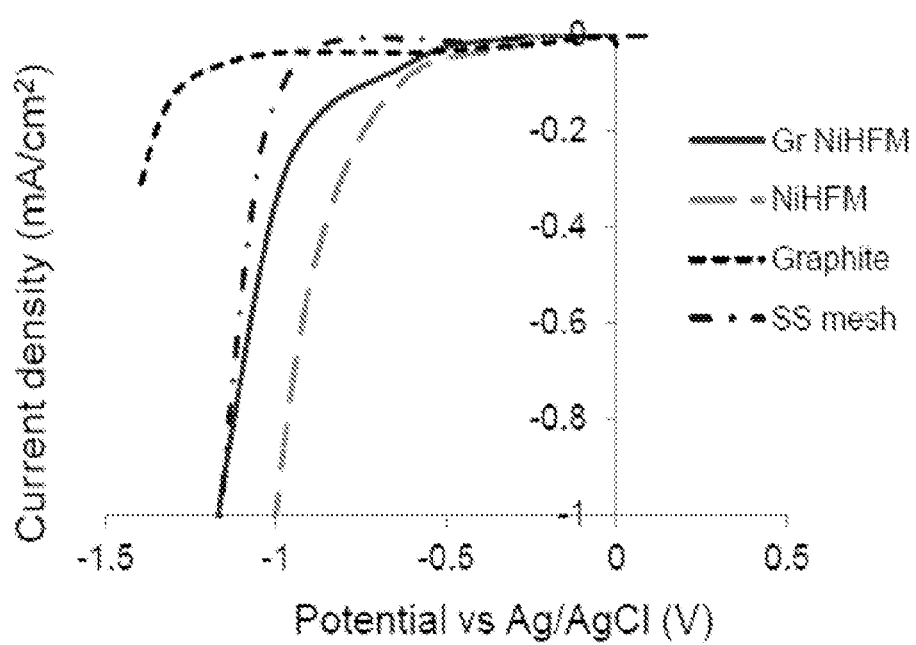
FIG. 19 is a graph depicting LSVs for graphene-coated Ni-HFM, uncoated Ni-HFM, stainless steel, and graphite.

Graphene coated Ni-HFM showed a similar overpotential compared to uncoated Ni-HFM (~−0.5 V) which was lower than that of stainless steel (~−0.8 V) and graphite (~−1.2 V) (FIG. 19). This demonstrated that adding the graphene coating did not alter the Ni-HFM overpotential for HER. All of the materials tested had baseline currents of close to zero at 0 V, which shows that each has a relatively high overpotential. See, Ribot-Llobet, E.; Nam, J.-Y.; Tokash, J. C.; Guisasola, A.; Logan, B. E., Assessment of four different cathode materials at different initial pHs using unbuffered catholytes in microbial electrolysis cells. Int. J. Hydrogen Energ. 2013, 38, (7), 2951-2956, which is incorporated by reference in its entirety. At −1.4 V, the graphene coated Ni-HFM produced 2.8 mA/cm², substantially more than graphite (0.3 mA/cm²), but less than that obtained with uncoated Ni-HFM (7.3 mA/cm²) and stainless steel (3.6 mA/cm²). Thus, the graphene coating slightly reduced the working current compared to Ni-HFM, likely due to the extra carbon layer, although it did not affect the overpotential.

Performance and Fouling of AnEMBRs Acclimated at Different Applied Voltages.

The time needed for appreciable current generation was slightly longer in AnEMBRs acclimated at $E_{ps}$=0.7 V than those at $E_{ps}$=0.9 V. Reactors began to produce stable current after nearly 13 days ($E_{ps}$=0.9 V) and 15 days ($E_{ps}$=0.7 V) (FIG. 20).

Figure 20:
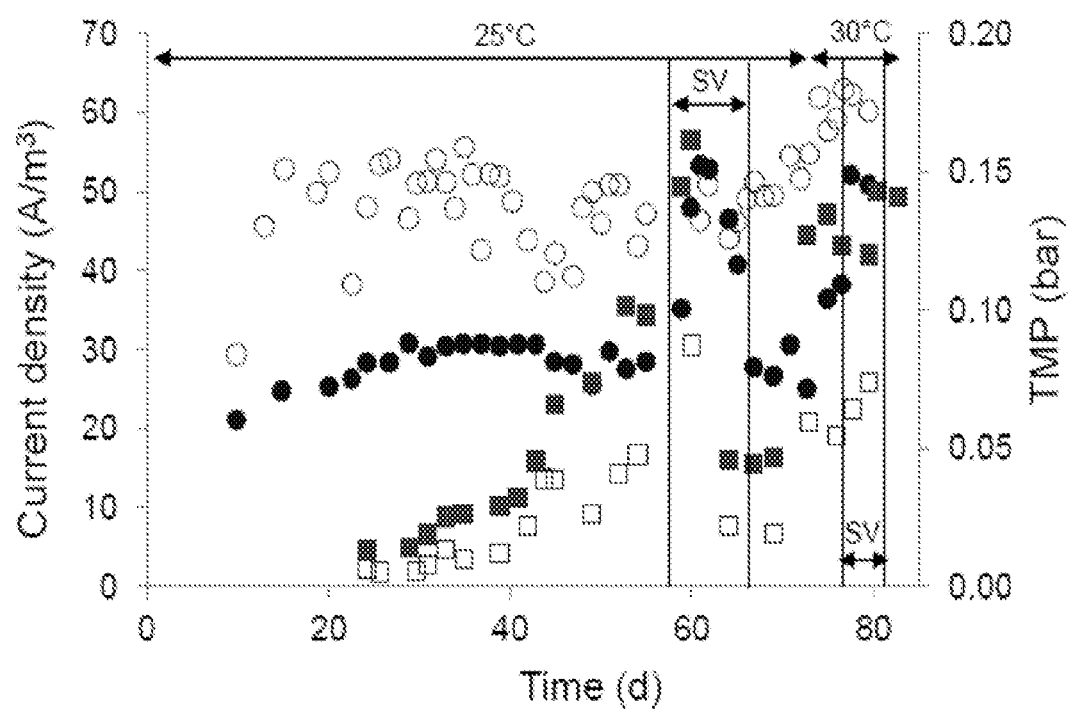
FIG. 20 is a graph depicting peak volumetric current densities (circles) and TMP (squares) of duplicate AnEMBRs operated at 0.7 V (closed circles, closed squares) and 0.9 V (open circles, open squares). Values represent averages of duplicate reactors. Reactors were operated at 30° C. from day 72 until the end of the experiment. Sections denoted SV between vertical lines indicate cycles at which 0.7 V reactors were switched to 0.9 V.

AnEMBRs produced an average current density of 29.1±1.8 A/m3 (3.4±0.2 A/m², duplicate reactors) at an applied voltage of $E_{ps}$=0.7 V, and 49.3±4.6 A/m3 (5.7±0.5 A/m²) at $E_{ps}$=0.9 V over the first 50 days of operation (FIG. 20). The current density measured here at $E_{ps}$=0.7 V was 162% higher than that reported previously for an AnEMBR (11.1 A/m³) using uncoated Ni-HFM as the cathode and a different electrode and reactor configuration, at the same applied voltage. The internal resistance of the newly configured AnEMBR with graphene coated Ni-HFM was 21.2±0.4Ω compared to 34.2±0.3Ω for the previous AnEMBR using uncoated Ni-HFM. The increase in current generation was partly due to this reduced internal resistance.

Reactor performance was evaluated at different points in time. Initial cycles following stable current production, and up to 30 days, represented the period of maximum hydrogen recovery. The performance after ~50 days of operation, prior to membrane cleaning, represents a period where methanogenesis was well established. The final stage at 80 days indicates performance following membrane cleaning, and at a higher temperature (30° C.).

The coulombic efficiency (CE) was >100% during the first 30 days of operation at both applied potentials (Table 8). There are two possible reasons for CEs exceeding 100%: hydrogen recycling by exoelectrogenic anode bacteria using hydrogen as the electron donor; or the presence of homoacetogenic bacteria that convert hydrogen to acetate which is then oxidized to current by exoelectrogens. See, Lee, H.-S.; Torres, C. s. I.; Parameswaran, P.; Rittmann, B. E., Fate of H2 in an upflow single-chamber microbial electrolysis cell using a metal-catalyst-free cathode. Environ. Sci. Technol. 2009, 43, (20), 7971-7976, Parameswaran, P.; Torres, C. I.; Kang, D.-W.; Rittmann, B. E.; Krajmalnik-Brown, R., The role of homoacetogenic bacteria as efficient hydrogen scavengers in microbial electrochemical cells (MXCs). Water Sci. Technol. 2012, 65, (1), and Parameswaran, P.; Tones, C. I.; Lee, H.-S.; Rittmann, B. E.; Krajmalnik-Brown, R., Hydrogen consumption in microbial electrochemical systems (MXCs): The role of homo-acetogenic bacteria. Bioresour. Technol. 2011, 102, (1), 263-271, each of which is incorporated by reference in its entirety. It is generally considered that hydrogen recycling is the main reason for CEs>100%. See, Call, D.; Wagner, R.; Logan, B., Hydrogen production by *Geobacter* species and a mixed consortium in a microbial electrolysis cell. Applied and Environmental Microbiology 2009, 75, (24), 7579, and Lu, L.; Xing, D.; Xie, T.; Ren, N.; Logan, B. E., Hydrogen production from proteins via electrohydrogenesis in microbial electrolysis cells. Biosens. Bioelectron. 2010, 25, (12), 2690-2695, each of which is incorporated by reference in its entirety. The possibility of acetogenesis has not been well explored in these systems.

Hydrogen recoveries were the highest over this initial period of six days following stable current generation, and reached 0.21±0.05 m³H₂/m³ d at $E_{ps}$=0.7 V, and 0.41±0.08 m³H₂/m³ d at $E_{ps}$=0.9 V (Table 8). The CEs decreased to 83% ($E_{ps}$=0.7 V) and 79% ($E_{ps}$=0.9 V) at 50 days, but increased slightly to 92% at both applied voltages at 80 days when the reactors were operated at 30° C. (Table 8).

The composition of the recovered gas shifted from predominantly hydrogen to a mix of hydrogen and methane over the course of the experiment (FIG. 4.5). Cathodic recovery of biogas ($rC_{at}$) was 0.76 (30 days) and 0.75 (50 days) at $E_{ps}$=0.9 V, compared to 0.69 (30 days) and 0.60 (50 days) at $E_{ps}$=0.7 V (Table 8). At 80 days (30° C.) the $rC_{at}$ increased to 0.91 for reactors at $E_{ps}$=0.9 V but dropped slightly to 0.58 for $E_{ps}$=0.7 V (Table 8).

TABLE 8

Performance of AnEMBRs acclimated at different applied voltages $E_{ps}$ = 0.7 V

| Experimental stage | Acetate removed (%) | CE (%) | $Q_{H2}$ ($m^3/m^3$ d) | $Q_{CH4}$ ($m^3m^3$ d) | $r_{cat}$ (biogas) |
|---|---|---|---|---|---|
| 30 days | 83.3 ± 4.1 | 104 ± 16 | 0.21 ± 0.05 | 0.01 ± 0.01 | 0.69 ± 0.13 |
| 50 days | 89.5 ± 2.8 | 83 ± 21 | 0.07 ± 0.06 | 0.04 ± 0.02 | 0.60 ± 0.08 |
| 80 days (30° C.) | 88.6 ± 5.5 | 92 ± 6 | 0.07 ± 0.05 | 0.07 ± 0.02 | 0.58 ± 0.07 |

$E_{ps}$ = 0.9 V

| Experimental stage | Acetate removed (%) | CE (%) | $H_2$ rate ($m^3/m^3/d$) | $CH_4$ rate ($m^3m^3/d$) | $r_{cat}$ (biogas) |
|---|---|---|---|---|---|
| 30 days | 62.1 ± 3.6 | 137 ± 20 | 0.41 0.08 | 0.01 ± 0.004 | 0.76 ± 0.10 |
| 50 days | 83.4 ± 7.6 | 79 ± 30 | 0.17 0.08 | 0.07 ± 0.030 | 0.75 ± 0.14 |
| 80 days (30° C.) | 84.4 ± 4.8 | 93 ± 7 | 0.23 0.11 | 0.14 ± 0.050 | 0.91 ± 0.08 |

The slight drop in average current density observed at 40 days for reactors at $E_{ps}$=0.9 V was due to experimental error during a filtration cycle that affected anode performance. The reactors recovered to produce current densities similar to those measured before the error within a few days. The anode potentials were more negative for reactors at $E_{ps}$=0.7 V (−0.38±0.01 V vs Ag/AgCl) than the reactors at $E_{ps}$=0.9 V (−0.28±0.02 V vs Ag/AgCl), which enabled their better performance. Electrode potentials were measured periodically with a multimeter and measurements showed that these were stable over the duration of the experiment. A change in temperature from 25° C. to 30° C. increased current generation by 29% for reactors at $E_{ps}$=0.7 V (37.4±4.4 A/m$^3$) and 23% for reactors at $E_{ps}$=0.9 V (60.8±5.4 A/m$^3$).

Filtration and TMP measurements were started after 24 days of operation. Reactors acclimated at $E_{ps}$=0.9 V showed overall lower TMP than those acclimated at $E_{ps}$=0.7 V over the course of the experiment (FIG. 20). From day 24 to 40 the TMP for reactors at $E_{ps}$=0.7 V was twice that of reactors at $E_{ps}$=0.9 V illustrating a delayed onset of fouling for reactors acclimated at $E_{ps}$=0.9 V. After 60 days of operation the TMP for $E_{ps}$=0.7 V reactors reached a maximum of 0.16 bar compared to 0.08 bar for reactors at $E_{ps}$=0.9 V. Increasing the applied voltage from 0.7 V to 0.9 V (day 59) showed no effect on the TMP (FIG. 20). This was unexpected as previous findings showed a noticeable drop in TMP when the applied voltage was changed from 0.5 V to 0.9 V.

After chemically cleaning the membranes (day 64) with sodium hypochlorite and concentrated HCl, the TMP decreased significantly to 0.05 bar ($E_{ps}$=0.7 V) and 0.02 bar ($E_{ps}$=0.9 V). After further operation for 16 days, the TMP of reactors at $E_{ps}$=0.7 V increased to 0.14 bar compared to 0.07 bar for reactors at $E_{ps}$=0.9 V (FIG. 20). Although the TMP increased for both set of reactors with time, the final TMP values (83 days of operation) were 70% ($E_{ps}$=0.7 V) and 86% ($E_{ps}$=0.9 V) lower than the previous tubular design (0.5 bar, 70 days of operation).

Figure 22:
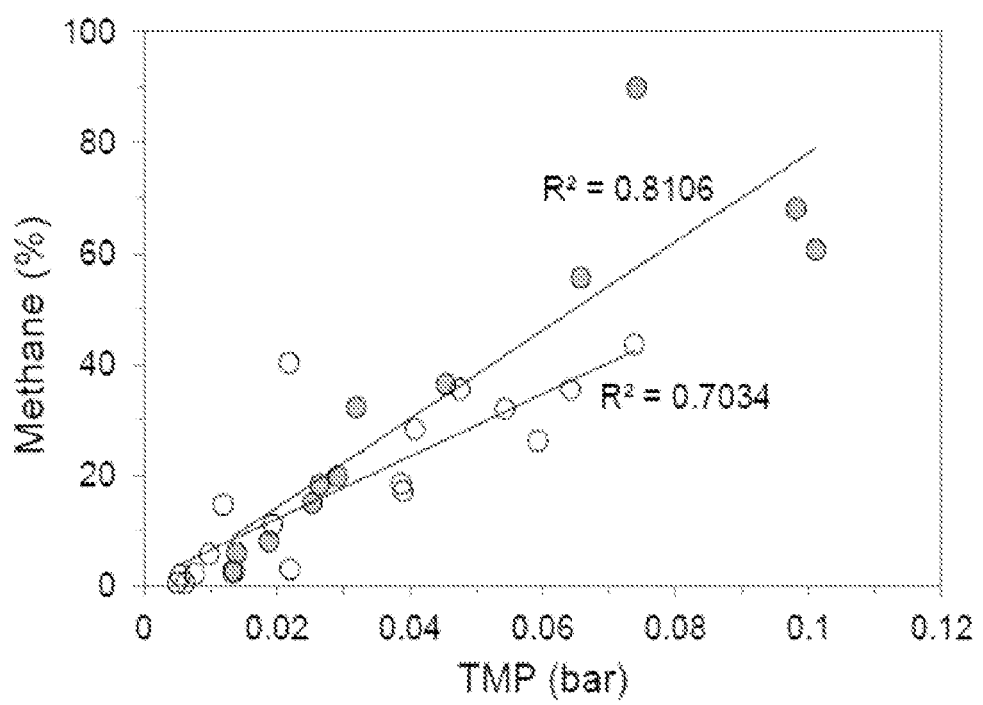
FIG. 22 is a graph depicting percentage of methane in recovered gas and TMP for reactors operated at $E_{ps}$=0.7 V (solid circles) and $E_{ps}$=0.9 V (open circles).
Figure 23:
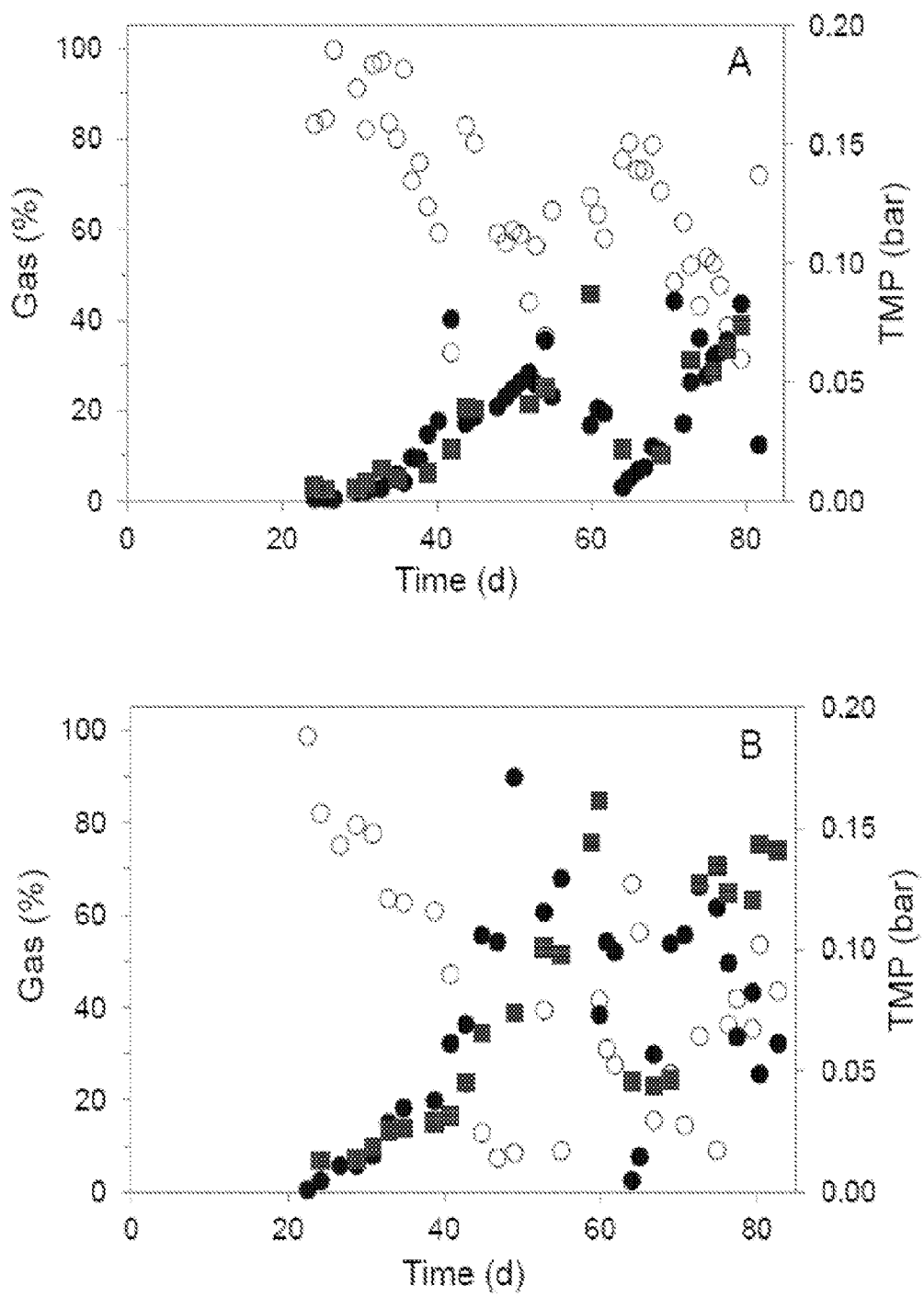
FIG. 23 is a graph depicting percentage of hydrogen (open circles) and methane (closed circles) in the biogas and TMP (closed squares) for reactors acclimated at (A) $E_{ps}$=0.9 V and (B) $E_{ps}$=0.7 V.

The increase in TMP correlated with the increase in methane production at both voltages (FIG. 22). Methane was detected at very low concentrations after 20 days ($E_{ps}$=0.7 V) and 23 days ($E_{ps}$=0.9 V) and increased steadily with successive cycles. Methane generation increased more rapidly at $E_{ps}$=0.7 V compared to $E_{ps}$=0.9 V (FIGS. 23A and 23B) and became the predominant gas after 42 days of operation at $E_{ps}$=0.9 V, except when the applied voltage was increased from 0.7 V to 0.9 V (FIG. 23, panel B). By contrast, hydrogen was dominant in the biogas at $E_{ps}$=0.9 V for the duration of the experiment (FIG. 23, panel A). It is likely that methane was produced by hydrogenotrophic methanogens, as previously observed in the original AnEMBR study. The longer hydraulic retention time (HRT) of approximately 48 h at $E_{ps}$=0.7 V, compared to 24 hours at $E_{ps}$=0.9 V, likely allowed for more extensive hydrogenotrophic conversion of hydrogen to methane. It is clear that hydrogenotrophic methanogens contributed significantly to membrane fouling of AnEMBRs considering the correlation between increased TMP and increased methane generation.

Figure 24:
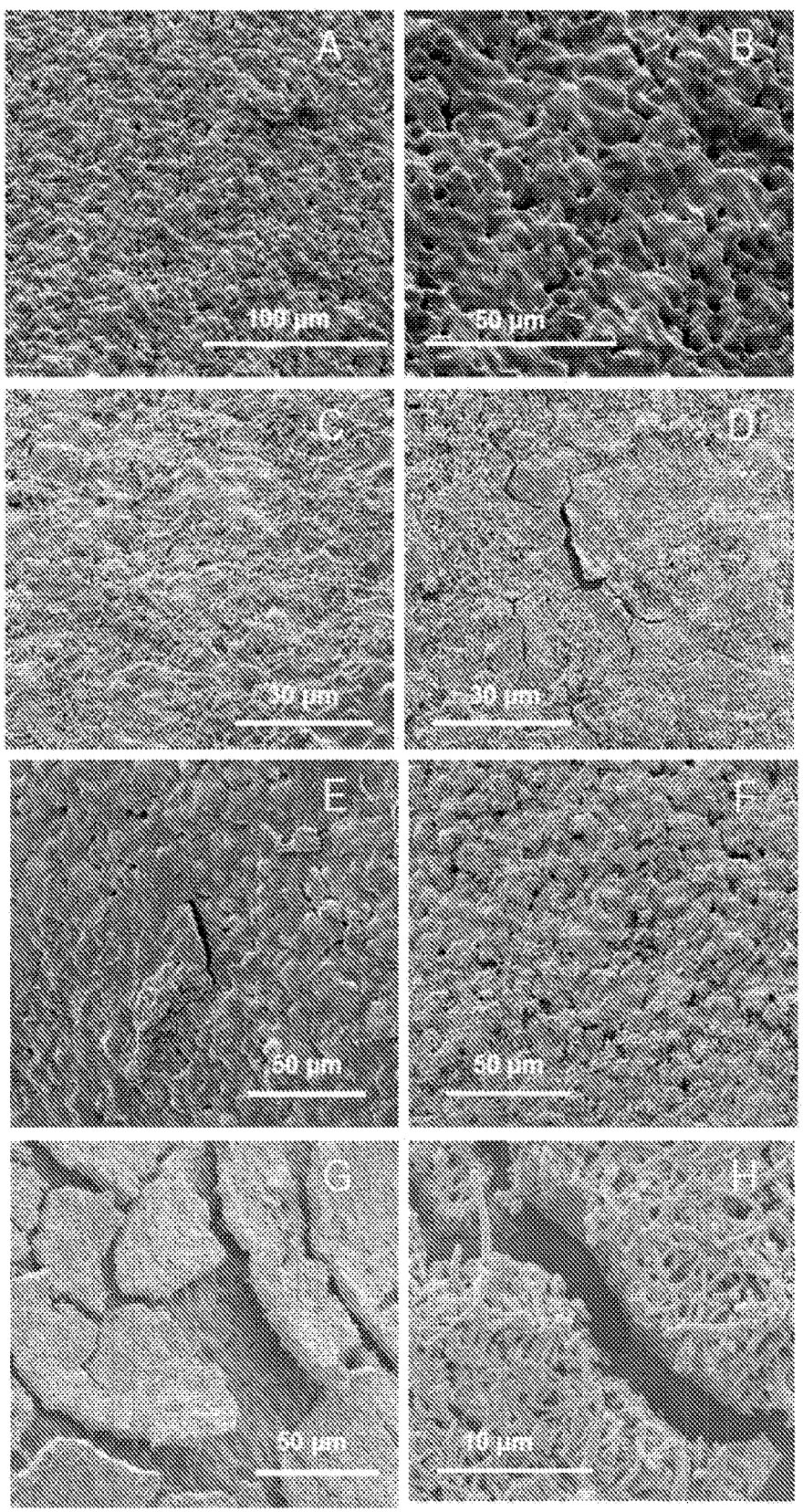
FIG. 24 is a series of scanning electron micrographs (A-H) of graphene coated Ni-HFMs (A and B) before operation, (C=0.7 V, D=0.9 V) after 64 days of operation and (E=0.7 V, F=0.9V) after 83 days of operation. Also shown are SEM images of graphene coated NiHFMs from the previous tubular reactor used during startup and approximately 30 days of operation at 0.7 V (G and H).

Scanning electron microscopy images revealed that the membrane fouling layer was relatively flat and thin after 64 days of operation (FIG. 24, panels C and D). The fouling layer was comprised of irregular scattering of cells and a glue-like coating, presumed to be the extracellular polymers (EPS) that hold the cells together. See, De Beer, D.; Stoodley, P., Microbial Biofilms. In The Prokaryotes, Dworkin, M.; Falkow, S.; Rosenberg, E.; Schleifer, K.-H.; Stackebrandt, E., Eds. Springer New York: 2006; pp 904-937, which is incorporated by reference in its entirety. There was no clear difference in the morphology or coverage of the fouling layer to explain the difference in TMP measurements for the two sets of reactors. It may be that the EPS was denser and more established at $E_{ps}$=0.7 V reactors compared to membranes at $E_{ps}$=0.9 V. However, additional analyses, based on extraction and quantification of the EPS, would need to be conducted to verify this. The fouling layers formed in this example were approximately 0.4-0.5 μm thick (FIG. 24, panels C and D), approximately one tenth the thickness of the fouling layer observed for the previous tubular AnEMBR design (~4 μm) (FIG. 24 panels G and H). In that study, the fouling layer was homogenous and comprised of multiple layers of cells. This suggests that the improved design reported here, which enabled higher current, and resulted in higher hydrogen production rates and shorter HRTs, had a significant effect on the development and morphology of the initial fouling layer. The morphology of the fouling layer that developed after cleaning was different for reactors at $E_{ps}$=0.7 V and $E_{ps}$=0.9 V (FIG. 24, panels E and F). The fouling layer at $E_{ps}$=0.7 V reactors appeared to contain larger quantities of EPS whereas the fouling layer at $E_{ps}$=0.9 V appeared more sponge-like with less EPS (FIG. 24, panels E and F). More open pores were visible in the membranes from reactors at $E_{ps}$=0.9 V compared to membranes from reactors at $E_{ps}$=0.7 V. The presence of more open pores could explain the lower TMP measured for reactors at $E_{ps}$=0.9 V after 83 days of operation (FIGS. 20 and 24).

Energy Recovery and Efficiency

Energy recoveries relative to electricity and substrate ($\eta_{E+s}$) did not correlate with applied voltage, and decreased with time from $\eta_{E+S}$=61.5±14.4 to 45±8% (Eps=0.7 V) and $\eta_{E+S}$=65±10 to 50±9% ($E_{ps}$=0.9 V) between day 30 and day 50 (Table 9). An increase in temperature to 30° C. at 80 days resulted in increased energy recoveries to $E_{ps}$=49±6 at $E_{ps}$=0.7 V, and $\eta_{E+S}$=66±7 at $E_{ps}$=0.9 V (Table 9). The energy content of the biogas exceeded the electricity consumed by the power source and the filtration pump ($\eta_E$) at both applied voltages for all stages of the experiment (Table 9). The energy recovery relative to electricity input ($\eta_E$) was higher at $E_{ps}$=0.7 V, except for the final stage at 30° C. where $\eta_E$=174±14 at $E_{ps}$=0.9 V (Table 9). Energy efficiency relative to the substrate added ($\eta_S$) was higher at $E_{ps}$=0.9 V (Table 9). The fraction of energy derived from the power source ($e_E$) was larger at $E_{ps}$=0.9 V but the contribution from the substrate ($e_S$) was greater at $E_{ps}$=0.7 V (Table 9).

Energy Balances

Volumetric energy densities were calculated by normalizing net energy input to 1 m3 of solution treated. Electricity consumed by the power source was by far the largest portion of the overall energy demand and energy for filtration was almost negligible. At points when the TMP was highest (day 60), the energy needed to filter the solution was 0.44×10-3 kWh/m³ ($E_{ps}$=0.7 V) and 0.24×10-3 kWh/m³ ($E_{ps}$=0.9 V) which was <0.1% of the energy consumed by the power source. This is substantially less than 0.0014 kWh/m³ recently reported for pumping permeate through the membranes in an anaerobic fluidized membrane bioreactor. See, Ren, L.; Ahn, Y.; Logan, B. E., A two-stage microbial fuel cell and anaerobic fluidized bed membrane bioreactor (MFC-AFMBR) system for effective domestic wastewater treatment. Environ. Sci. Technol. 2014, 48, (7), 4199-4206, which is incorporated by reference in its entirety. However, the permeate flux in that study was higher (16 LMH) and the membranes had a pore size of 0.1 μm, one-tenth the average pore size of the graphene coated Ni-HFMs.

Figure 21:
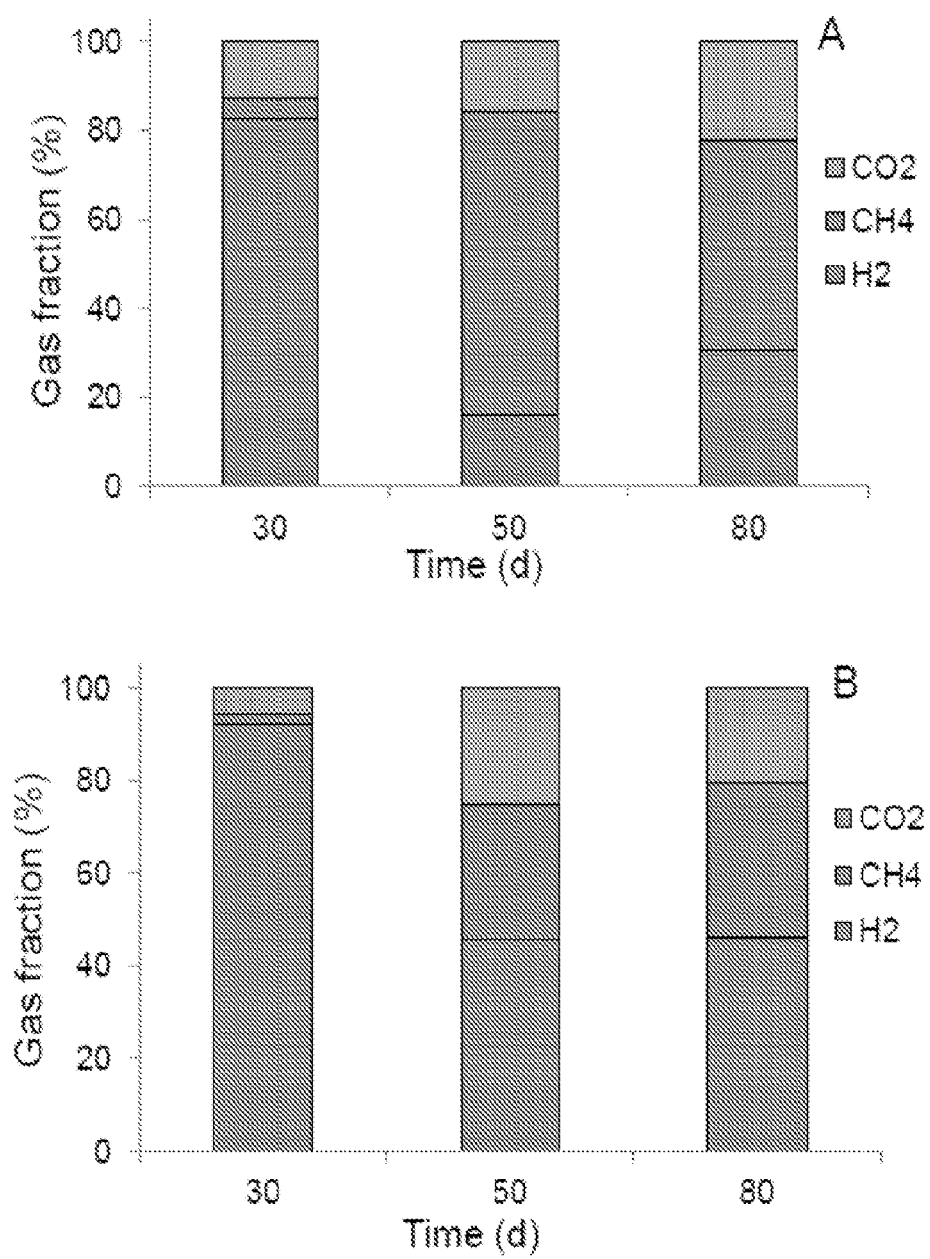
FIG. 21 is a graph depicting percentages of $H_2$, $CH_4$ and $CO_2$ in the biogas from reactors at $E_{ps}$=0.7 V (A) and $E_{ps}$=0.9 V (B) for different stages of the experiment.

AnEMBRs showed a net positive energy gain at both applied voltages over the course of the experiment (Table 10). A maximum energy recovery of 1.12±0.19 kWh/m3 at $E_{ps}$=0.7 V and 1.06±0.19 kWh/m³ at $E_{ps}$=0.9 V was achieved during the initial 30 days (Table 10). The gas recovered in this period contained mostly hydrogen (FIGS. 21 and 23). The energy content of the hydrogen was similar for both applied voltages (0.57 kJ) and represented an energy recovery of 0.96 kWh/m³. Assuming a hydrogen fuel cell efficiency of 83%, 44 the maximum amount of electricity that could be produced from this hydrogen is 0.80 kWh/m³. This exceeds the electricity input to drive hydrogen evolution and filter the effluent by 16% at $E_{ps}$=0.7 V ($W_{E+F}$=0.69 kWh/m³) and 14% at $E_{ps}$=0.9 V ($W_{E+F}$=0.70 kWh/m³), making the process fully energy positive during the initial stage of operation (Table 10).

TABLE 9

Energy recoveries and electrical and substrate efficiencies of AnEMBRs acclimated at different applied voltages

| Experimental stage | $\eta_E$ (%) | $\eta_S$ (%) | $\eta_{E+S}$ (%) | $e_E$ (%) | $e_S$ (%) |
|---|---|---|---|---|---|
| $E_{ps}$ = 0.7 V | | | | | |
| 30 days | 165.5 ± 37.8 | 99.1 ± 24.6 | 61.5 ± 14.4 | 37.5 ± 3.7 | 62.5 ± 3.7 |
| 50 days | 140.6 ± 19.8 | 67.5 ± 14.7 | 45.2 ± 7.7 | 32.4 ± 5.4 | 67.6 ± 5.4 |
| 80 days (30° C.) | 139.9 ± 17.4 | 73.4 ± 8.8 | 48.4 ± 5.6 | 34.6 ± 1.6 | 65.4 ± 1.6 |
| $E_{ps}$ = 0.9 V | | | | | |
| 30 days | 151 ± 18.5 | 132 ± 24 | 65.2 ± 9.8 | 45.2 ± 4.4 | 54.8 ± 4.4 |
| 50 days | 142 ± 23.4 | 79.1 ± 20.9 | 49.9 ± 8.7 | 35.6 ± 6.8 | 64.5 ± 6.8 |
| 80 days (30° C.) | 173.6 ± 14.3 | 116.4 ± 12.9 | 66.4 ± 6.6 | 39.3 ± 1.9 | 60.7 ± 1.9 |

TABLE 10

Volumetric energy balance of AnEMBRs acclimated at different applied voltages

| Experimental stage | $W_{E+F}$ (kWh/m³) | Biogas (kWh/m³) | Net energy (kWh/m³) |
|---|---|---|---|
| $E_{ps}$ = 0.7 V | | | |
| 30 days | 0.69 ± 0.06 | 1.12 ± 0.19 | 0.44 ± 0.23 |
| 50 days | 0.60 ± 0.05 | 0.84 ± 0.12 | 0.24 ± 0.12 |
| 80 days (30° C.) | 0.54 ± 0.05 | 0.76 ± 0.11 | 0.22 ± 0.10 |
| $E_{ps}$ = 0.9 V | | | |
| 30 days | 0.70 ± 0.03 | 1.06 ± 0.14 | 0.36 ± 0.13 |
| 50 days | 0.62 ± 0.07 | 0.87 ± 0.10 | 0.25 ± 0.11 |
| 80 days (30° C.) | 0.71 ± 0.05 | 1.23 ± 0.12 | 0.52 ± 0.10 |

The composition of the recovered gas shifted from predominantly hydrogen (>80%) to a mixture of hydrogen and methane after 50 days of operation (FIGS. 21 and 23). This presents a challenge to harnessing the recovered energy since the technologies for converting hydrogen and methane to electricity are different. The constituents of the gas would need to be separated using a gas separation stage prior to conversion to electricity. Gas separation would consume a part of the recovered energy but this is not the major limitation since even the hydrogen-rich stream would need to be purified to remove the residual $CO_2$ before use in a fuel cell. See, Shao, L.; Low, B. T.; Chung, T.-S.; Greenberg, A. R., Polymeric membranes for the hydrogen economy: Contemporary approaches and prospects for the future. J. Membr. Sci. 2009, 327, (1-2), 18-31, and Basu, S.; Khan, A. L.; Cano-Odena, A.; Liu, C.; Vankelecom, I. F., Membrane-based technologies for biogas separations. Chem. Soc. Rev. 2010, 39, (2), 750-768, each of which is incorporated by reference in its entirety. A gas comprised of a mixture of $H_2$ and $CH_4$ results in less energy due to the low conversion efficiencies of methane combustion (33%). See, Kim, J.; Kim, K.; Ye, H.; Lee, E.; Shin, C.; McCarty, P. L.; Bae, J., Anaerobic fluidized bed membrane bioreactor for wastewater treatment. Environ. Sci. Technol. 2011, 45, (2), 576-581, which is incorporated by reference in its entirety. For example, after 50 days the methane fraction of the biogas was 68% ($E_{ps}$=0.7 V) and 25% ($E_{ps}$=0.9 V) (FIG. 21) with an energy mix of 0.16 kJ $H_2$, 0.34 kJ $CH_4$ ($E_{ps}$=0.7 V) and 0.23 kJ H2, 0.29 kJ CH4 ($E_{ps}$=0.9 V) on average. Using conversion efficiencies of 83% for hydrogen and 33% for methane, the maximum electrical energy that could be recovered is 0.41 kWh/m3 ($E_{ps}$=0.7 V) and 0.49 kWh/m$^3$ ($E_{ps}$=0.9 V). These energy recoveries would be sufficient to satisfy 68% ($E_{ps}$=0.7 V) and 79% ($E_{ps}$=0.9 V) of the electrical input. During this period, the net process energy was therefore negative (energy demanding). However, these energy deficits of 0.19 kWh/m$^3$ ($E_{ps}$=0.7 V) and 0.13 kWh/m$^3$ (Eps=0.9 V) are still considerably less than conventional activated sludge processes (0.6 kWh/m$^3$).

Figure 25:
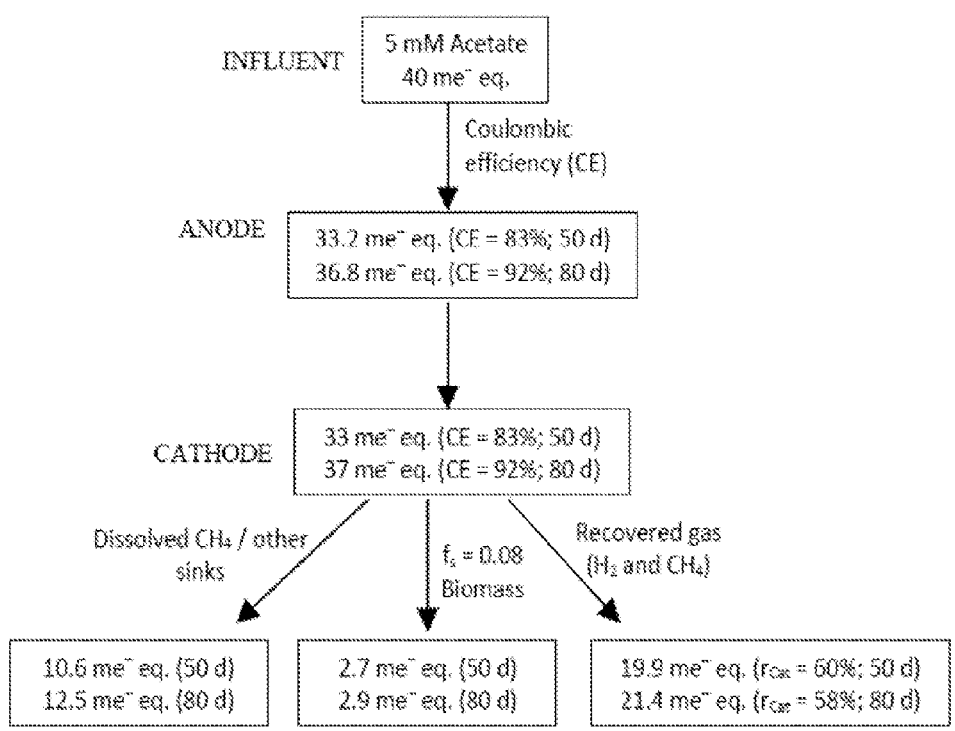
FIG. 25 is a schematic of estimation of the fraction of electrons not accounted for in the recovered gas and potentially present as dissolved methane for reactors at $E_{ps}$=0.9 V at 50 and 80 days of operation. The values were determined using a fs of 0.08 for hydrogenotrophic methanogens1 and the values of CE and $r_{cat}$ from Table 8.

Up to 31% ($E_{ps}$=0.7 V) and 14% ($E_{ps}$=0.9 V) of substrate electrons were unaccounted for in these systems (FIG. 25). Incomplete recovery of gas may account for a portion of these electrons and the remainder may have been present as dissolved methane in solution. Release of methane dissolved in solution poses a risk to the environment and can be monitored in future AnEMBR applications.

Permeate Water Quality

Total acetate removal was >80% at both applied voltages except for the initial period at $E_{ps}$=0.9 V, where acetate removal was low (62%). The total suspended solids in the permeate was very low for both reactors (0.05 mg/L). This is substantially lower than the 17 mg/L measured in the previous study. The pore size of the graphene Ni-HFM, as revealed by SEM, showed that the apparent pore size was similar to the Ni-HFM used previously (~1 μm). The lower TSS may therefore be due to the shorter HRTs and faster reaction times, which may have minimized the accumulation of cells in suspension. It would be difficult to predict the permeate quality for actual wastewaters since real domestic wastewaters have some TSS unlike the acetate solution used here. Improvements in membrane fabrication to reduce the pore size would help to improve permeate quality using these systems with actual wastewaters.

Biofouling of graphene coated Ni-HFMs was minimized when the AnEMBR was acclimated and operated at higher applied voltages. The increase in TMP correlated with methane production. Increasing the applied voltage for reactors at $E_{ps}$=0.7 V to 0.9 V did not reduce the TMP as observed in the previous AnEMBR study (Chapter 4). The operation of the AnEMBR was net energy positive when hydrogen gas was dominant in the recovered gas, but became net energy negative as the methane fraction of the recovered gas increased. Strategies to minimize methanogenesis and maximize hydrogen yields can be considered in future AnEMBR applications.

Other embodiments are within the scope of the following claims.

---

What is claimed is:

1. An anaerobic electrochemical membrane bioreactor for treating wastewater comprising:
   a vessel into which wastewater is introduced;
   an anode electrode in the vessel containing electrochemically active microorganisms that oxidizes organic compounds in the wastewater; and
   a cathode membrane electrode in the vessel suitable for catalyzing the hydrogen evolution reaction to generate hydrogen and containing hydrogenotrophic methanogens that anaerobically generate an energy containing gas,
   wherein the cathode membrane electrode includes a membrane structure configured to pass a liquid through the membrane while retaining the electrochemically active microorganisms and the hydrogenotrophic methanogens in the vessel, and
   wherein the cathode membrane electrode includes a conductive porous hollow fiber, wherein the conductive porous hollow fiber is a filter for the liquid.

2. The anaerobic electrochemical membrane bioreactor of claim 1, wherein the anode electrode includes a carbon-based material.

3. The anaerobic electrochemical membrane bioreactor of claim 2, wherein the carbon-based material is graphite.

4. The anaerobic electrochemical membrane bioreactor of claim 1, wherein the cathode membrane electrode includes a porous membrane.

5. The anaerobic electrochemical membrane bioreactor of claim 1, wherein the conductive porous hollow fiber is coated with graphene.

6. The anaerobic electrochemical membrane bioreactor of claim 1, wherein the conductive porous hollow fiber includes a plurality of pores, wherein the size of pore is less than 1 micron and the diameter of the hollow fiber is less than 1 mm.

7. The electrochemical membrane bioreactor of claim 1, wherein the conductive porous hollow fiber includes a material capable of catalyzing the hydrogen evolution reaction selected from a group consisting of nickel, stainless steel, platinum, gold, silver, palladium, molybdenum, iron, cobalt, copper, iron, manganese, and carbon.

8. The anaerobic electrochemical membrane bioreactor of claim 1, wherein the vessel includes an inlet configured to supply the liquid into the vessel and an outlet configured to remove the liquid from the vessel after the liquid passes through the cathode membrane electrode.

9. The anaerobic electrochemical membrane bioreactor of claim 8, further comprising a pump arranged to remove the liquid from the outlet.

10. The anaerobic electrochemical membrane bioreactor of claim 1, wherein the anode electrode is surrounded by the cathode membrane electrode or the cathode membrane electrode is surrounded by the anode electrode.

11. The anaerobic electrochemical membrane bioreactor of claim 1, wherein the anode electrode and cathode membrane electrode are arranged next to each other.

12. The anaerobic electrochemical membrane bioreactor of claim 11, wherein the anode electrode and cathode membrane electrode are arranged horizontally with respect to each other or the anode electrode and cathode membrane electrode are arranged vertically with respect to each other.

13. The anaerobic electrochemical membrane bioreactor of claim 1, wherein the vessel includes a gas outlet and a gas collector connected to the outlet.

14. A method of treating wastewater comprising:
introducing the wastewater through the inlet of the electrochemical membrane bioreactor of claim 1,
passing the wastewater through the membrane electrode while retaining the electrochemically active microorganisms and the hydrogenotrophic methanogens in the vessel; and
removing the treated solution through from the outlet.

15. A method of recovering energy from an anaerobic electrochemical membrane bioreactor comprising:
collecting biogas generated at the surface of the cathode membrane electrode of claim 1.

16. The method of recovering energy from an electrochemical membrane bioreactor of claim 15, wherein the biogas is hydrogen gas or methane with an energy content that equals or exceeds energy required to operate the bioreactor.

17. The method of recovering energy from an electrochemical membrane bioreactor of claim 15, further comprising reducing biofouling at a surface of the cathode membrane electrode with the biogas evolving at the surface.

18. The method of recovering energy from an electrochemical membrane bioreactor of claim 15, further comprising adjusting the pH and electric potential of cathode membrane electrode in the bioreactor during biogas evolution reaction mitigate the biofouling.

19. The method of recovering energy from an electrochemical membrane bioreactor of claim 15, wherein the hydrogenotrophic methanogens in the vessel generate methane through $CO_2$ sequestration.

* * * * *

SEQUENCE LISTING

<160> NUMBER OF SEQ ID NOS: 20

<210> SEQ ID NO 1
<211> LENGTH: 16
<212> TYPE: DNA
<213> ORGANISM: Artificial Sequence
<220> FEATURE:
<223> OTHER INFORMATION: Synthethic primer-probe

<400> SEQUENCE: 1
atggytgtcg tcagct                                                     16

<210> SEQ ID NO 2
<211> LENGTH: 15
<212> TYPE: DNA
<213> ORGANISM: Artificial Sequence
<220> FEATURE:
<223> OTHER INFORMATION: Synthetic primer-probe

<400> SEQUENCE: 2
acgggcggtg tgtac                                                      15

<210> SEQ ID NO 3
<211> LENGTH: 15
<212> TYPE: DNA
<213> ORGANISM: Artificial Sequence
<220> FEATURE:

```
<223> OTHER INFORMATION: Synthetic primer-probe

<400> SEQUENCE: 3
caacgagcgc aaccc                                                         15

<210> SEQ ID NO 4
<211> LENGTH: 20
<212> TYPE: DNA
<213> ORGANISM: Artificial Sequence
<220> FEATURE:
<223> OTHER INFORMATION: Synthetic primer-probe

<400> SEQUENCE: 4
gcgtgtaggc ggtttcttaa                                                    20

<210> SEQ ID NO 5
<211> LENGTH: 20
<212> TYPE: DNA
<213> ORGANISM: Artificial Sequence
<220> FEATURE:
<223> OTHER INFORMATION: Synthethic primer-probe

<400> SEQUENCE: 5
tacccgcrac acctagttct                                                    20

<210> SEQ ID NO 6
<211> LENGTH: 20
<212> TYPE: DNA
<213> ORGANISM: Artificial Sequence
<220> FEATURE:
<223> OTHER INFORMATION: Synthetic primer-probe

<400> SEQUENCE: 6
attagatacc csbgtagtcc                                                    20

<210> SEQ ID NO 7
<211> LENGTH: 16
<212> TYPE: DNA
<213> ORGANISM: Artificial Sequence
<220> FEATURE:
<223> OTHER INFORMATION: Synthetic primer-probe

<400> SEQUENCE: 7
gccatgcacc wcctct                                                        16

<210> SEQ ID NO 8
<211> LENGTH: 20
<212> TYPE: DNA
<213> ORGANISM: Artificial Sequence
<220> FEATURE:
<223> OTHER INFORMATION: Synthetic primer-probe

<400> SEQUENCE: 8
aggaattggc gggggagcac                                                    20

<210> SEQ ID NO 9
<211> LENGTH: 19
<212> TYPE: DNA
<213> ORGANISM: Artificial Sequence
<220> FEATURE:
<223> OTHER INFORMATION: Synthetic primer-probe

<400> SEQUENCE: 9
cgwagggaag ctgttaagt                                                     19
```

```
<210> SEQ ID NO 10
<211> LENGTH: 18
<212> TYPE: DNA
<213> ORGANISM: Artificial Sequence
<220> FEATURE:
<223> OTHER INFORMATION: Synthetic primer-probe

<400> SEQUENCE: 10
taccgtcgtc cactcctt                                                 18

<210> SEQ ID NO 11
<211> LENGTH: 18
<212> TYPE: DNA
<213> ORGANISM: Artificial Sequence
<220> FEATURE:
<223> OTHER INFORMATION: Synthethic primer-probe

<400> SEQUENCE: 11
agcaccacaa cgcgtgga                                                 18

<210> SEQ ID NO 12
<211> LENGTH: 18
<212> TYPE: DNA
<213> ORGANISM: Artificial Sequence
<220> FEATURE:
<223> OTHER INFORMATION: Synthethic primer-probe

<400> SEQUENCE: 12
atcgrtacgg gttgtggg                                                 18

<210> SEQ ID NO 13
<211> LENGTH: 21
<212> TYPE: DNA
<213> ORGANISM: Artificial Sequence
<220> FEATURE:
<223> OTHER INFORMATION: Synthethic primer-probe

<400> SEQUENCE: 13
cacctaacgc rcathgttta c                                             21

<210> SEQ ID NO 14
<211> LENGTH: 24
<212> TYPE: DNA
<213> ORGANISM: Artificial Sequence
<220> FEATURE:
<223> OTHER INFORMATION: Synthethic primer-probe

<400> SEQUENCE: 14
tycgacagtg aggracgaaa gctg                                          24

<210> SEQ ID NO 15
<211> LENGTH: 18
<212> TYPE: DNA
<213> ORGANISM: Artificial Sequence
<220> FEATURE:
<223> OTHER INFORMATION: Synthethic primer-probe

<400> SEQUENCE: 15
gaaaccgyga taagggga                                                 18

<210> SEQ ID NO 16
<211> LENGTH: 18
<212> TYPE: DNA
<213> ORGANISM: Artificial Sequence
<220> FEATURE:
<223> OTHER INFORMATION: Synthethic primer-probe
```

```
<400> SEQUENCE: 16
tagcgarcat cgtttacg                                                  18

<210> SEQ ID NO 17
<211> LENGTH: 18
<212> TYPE: DNA
<213> ORGANISM: Artificial Sequence
<220> FEATURE:
<223> OTHER INFORMATION: Synthethic primer-probe

<400> SEQUENCE: 17
ttagcaaggg ccgggcaa                                                  18

<210> SEQ ID NO 18
<211> LENGTH: 20
<212> TYPE: DNA
<213> ORGANISM: Artificial Sequence
<220> FEATURE:
<223> OTHER INFORMATION: Synthethic primer-probe

<400> SEQUENCE: 18
taatcctyga rggaccacca                                                20

<210> SEQ ID NO 19
<211> LENGTH: 17
<212> TYPE: DNA
<213> ORGANISM: Artificial Sequence
<220> FEATURE:
<223> OTHER INFORMATION: Synthethic primer-probe

<400> SEQUENCE: 19
cctacggcac cracmac                                                   17

<210> SEQ ID NO 20
<211> LENGTH: 22
<212> TYPE: DNA
<213> ORGANISM: Artificial Sequence
<220> FEATURE:
<223> OTHER INFORMATION: Synthethic primer-probe

<400> SEQUENCE: 20
acggcaaggg acgaaagcta gg                                             22
```